(12) United States Patent
Nakamura et al.

(10) Patent No.: US 8,868,759 B2
(45) Date of Patent: Oct. 21, 2014

(54) COMMUNICATION SYSTEM AND SERVER

(75) Inventors: Shota Nakamura, Kawasaki (JP); Eri Kawai, Yokohama (JP); Takuma Utsunomiya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 210 days.

(21) Appl. No.: 13/220,210

(22) Filed: Aug. 29, 2011

(65) Prior Publication Data
US 2012/0124218 A1  May 17, 2012

(30) Foreign Application Priority Data

Nov. 11, 2010  (JP) ................................ 2010-252440

(51) Int. Cl.
| G06F 15/16 | (2006.01) |
| H04L 29/06 | (2006.01) |
| H04L 29/08 | (2006.01) |
| H04M 3/42 | (2006.01) |
| H04M 3/493 | (2006.01) |
| H04M 3/56 | (2006.01) |
| H04M 7/12 | (2006.01) |
| H04W 4/02 | (2009.01) |

(52) U.S. Cl.
CPC ...... *H04L 65/1083* (2013.01); *H04L 29/08108* (2013.01); *H04L 29/08576* (2013.01); *H04L 29/08072* (2013.01); *H04L 29/06* (2013.01); *H04M 3/42059* (2013.01); *H04M 3/42195* (2013.01); *H04M 3/42221* (2013.01); *H04M 3/4931* (2013.01); *H04M 3/56* (2013.01); *H04M 7/1205* (2013.01); *H04M 2207/18* (2013.01); *H04W 4/02* (2013.01)
USPC ......... 709/227; 455/414.1; 370/342; 370/352

(58) Field of Classification Search
CPC .............. H04L 65/1083; H04L 29/08108; H04L 29/08576; H04L 29/08072; H04L 29/06; H04M 3/42059; H04M 3/42195; H04M 3/42221; H04M 3/4931; H04M 3/56; H04M 7/1205; H04M 2207/18; H04W 4/02
USPC ................. 709/227; 455/414.1; 370/342, 352
See application file for complete search history.

(56) References Cited

U.S. PATENT DOCUMENTS 8,019,349 B2  9/2011  Noda et al.
8,082,346 B2  12/2011  Ito
(Continued)

FOREIGN PATENT DOCUMENTS

| JP | 2005-318439 A | 11/2005 |
| JP | 2007-104532 A | 4/2007 |

(Continued)

OTHER PUBLICATIONS

Japan Patent Office action on application JP 2013-150066 mailed May 20, 2014; pp. 1-2.

*Primary Examiner* — Kyung H Shin
(74) *Attorney, Agent, or Firm* — Foley & Lardner LLP

(57) ABSTRACT

A communication system and server includes a first memory for storing terminal information of a first terminal and a second terminal, a second memory for storing outgoing call history information of at least either the first terminal or the second terminal, a third memory for storing incoming call history information of at least either the first terminal or the second terminal; and a processing unit for reading out the information from the first memory to control at least either information of the second memory or the third memory in accordance with information contained in a notification from the communication device when setting the connection between at least either the first terminal or the second terminal and the communication device, therefore, two parties to be communicated with each other specify a connection terminal of a call source.

15 Claims, 26 Drawing Sheets

(56) References Cited

U.S. PATENT DOCUMENTS

| | | |
|---|---|---|
| 2007/0123224 A1* | 5/2007 | Nishiyama et al. ........ 455/414.1 |
| 2008/0071914 A1 | 3/2008 | Kimura et al. |
| 2009/0300189 A1 | 12/2009 | Takeda et al. |
| 2010/0235516 A1 | 9/2010 | Nakamura et al. |

FOREIGN PATENT DOCUMENTS

| | | |
|---|---|---|
| JP | 2007-274170 A | 10/2007 |
| JP | 2008-078878 | 4/2008 |
| JP | 2009-296138 A | 12/2009 |
| JP | 2010-213027 | 9/2010 |

* cited by examiner

FIG. 3A

| | 2010 | 2010_1 ---- 2010_n |
|---|---|---|
| 2011 | sessionID | 123456 |
| 2012 | SESSION CONDITION | Connected |
| 2020 | CALL PARTICIPANT CONDITION | *FIG. 3B |
| 2030_A | TERMINAL INFORMATION (FOR Client A) | *FIG. 3C |
| 2030_B | TERMINAL INFORMATION (FOR Client B) | *FIG. 3C |

FIG. 3B

| | 2020_A | 2020_B |
|---|---|---|
| URI (2021) | sip:2222222222@clientA.com | sip:3333333333@clientB.com |
| CALL CONDITION (2022) | CallParticipantConnected | CallParticipantConnected |
| START TIME (2023) | 2010.08.22 10:30:30 | 2010.10.08 10:30.45 |

FIG. 3C

|  | | 2030 | 2030_A | 2030_B |
|---|---|---|---|---|
| 2031 | HANDLE VALUE | 987654 | 765432 |
| 2032 | sessionID | 123456 | 123456 |
| 2033 | TERMINAL CONDITION | CallComplete | CallComplete |
| 2034 | Role | UA-A | UA-B |
| 2035 | send SDP INFORMATION | ------ 10.0.1.1  10000 | ------ 10.0.1.1  10000 |
| 2036 | recv SDP INFORMATION | ------ 10.0.2.1  20000 | ------ 10.0.2.2  30000 |
| 2037 | From URI | sip:1111111111 @SSA.com | sip:1111111111 @SSA.com |
| 2038 | To URI | sip:2222222222 @clientA.com | sip:3333333333 @clientB.com |

FIG. 3D

| | 2040 | 2040_1 | ---- 2040_n |
|---|---|---|---|
| 2041 | sessionID | 123456 | |
| 2042 | MEDIA STREAM TRANSMISSION/ RECEPTION IP ADDRESS | 10.0.1.1 | |
| 2043 | MEDIA STREAM TRANSMISSION/ RECEPTION PORT NUMBER | 10000 | |
| 2044 | DESTINATION IP ADDRESS 1 | 10.0.2.1 | |
| 2045 | DESTINATION PORT NUMBER 1 | 20000 | |
| 2046 | DESTINATION IP ADDRESS 2 | 10.0.2.2 | |
| 2047 | DESTINATION PORT NUMBER 2 | 30000 | |

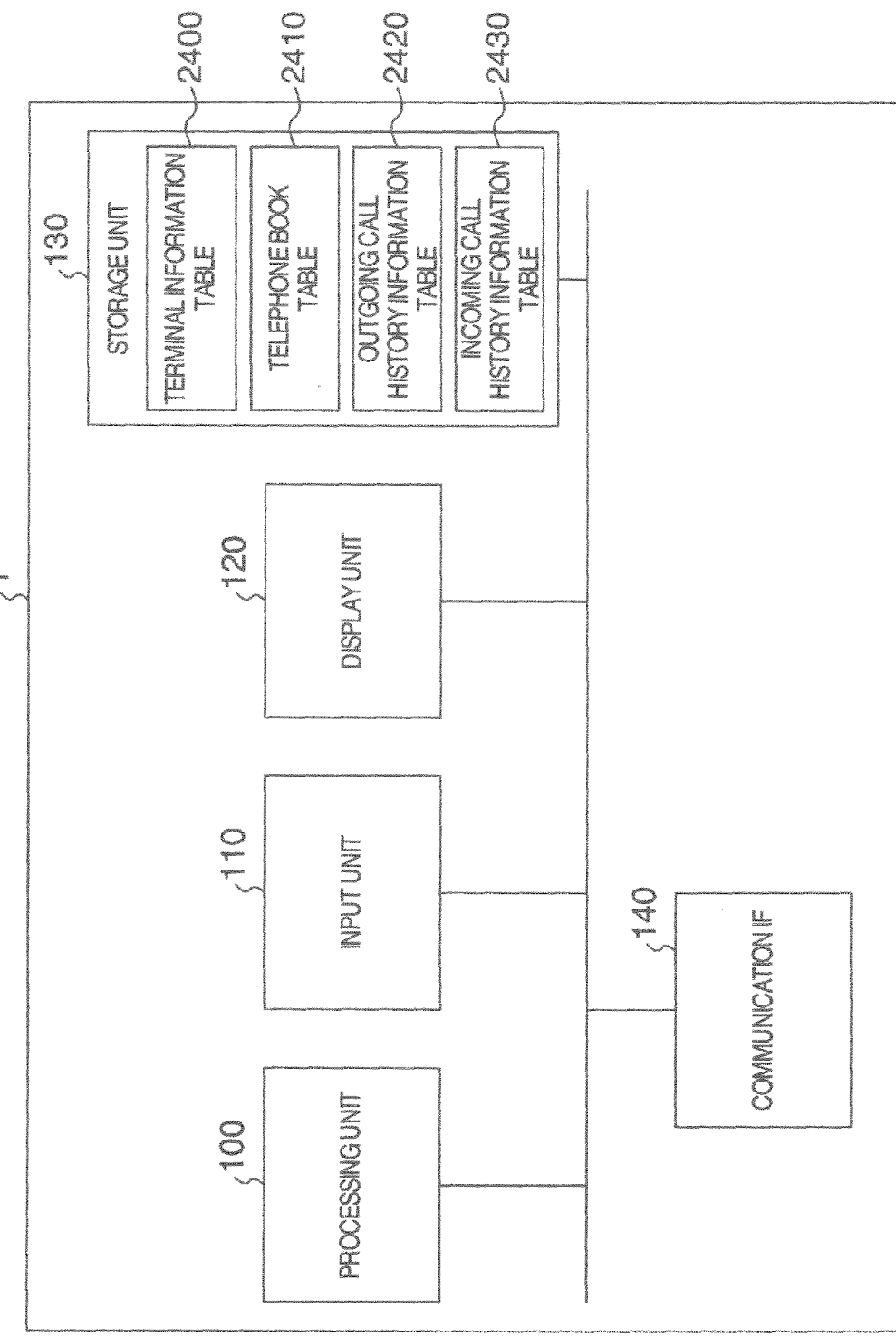

FIG. 5A

| | | | | | |
|---|---|---|---|---|---|
| 2401 — USER ID | 0001 | 0001 | 0002 | 0003 | 0004 |
| 2402 — TERMINAL ID | 01 | 02 | 01 | 01 | 01 |
| 2403 — TERMINAL NAME | FIXED | MOBILE | MOBILE | MOBILE | MOBILE |
| 2404 — TELEPHONE NUMBER | 0311111111 | 09011111111 | 09022222222 | 09033333333 | 09044444444 |
| 2405 — Correlator | 11111111-11ab-11ab-ffff-111111111111 | | 22222222-12ab-12ab-ffff-222222222222 | 33333333-13ab-13ab-ffff-333333333333 | 44444444-14ab-14ab-ffff-444444444444 |
| 2406 — TERMINAL REGISTRATION CONDITION | REGISTERED | UNREGISTERED | REGISTERED | REGISTERED | REGISTERED |

| 2410 | | | | | |
|---|---|---|---|---|---|
| 2411 — ID | 1 | 2 | ... | 10 | ... |
| 2412 — USER ID | 0001 | 0001 | ... | 0002 | ... |
| 2413 — NAME | HITACHI TARO | KASHIMADA HANAKO | ... | SHINKAWASAKI TARO | ... |
| 2414 — PHONETIC SYMBOL | HITACHI TARO | KASHIMADA HANAKO | ... | SHINKAWASAKI TARO | ... |
| 2415 — ADDRESS | sip:09033333333@sample.com | sip:09022222222@sample.com | ... | sip:0311111111@sample.com | ... |
| 2416 — DISPLAY ADDRESSD | 09033333333 | 09022222222 | ... | 0311111111 | ... |

FIG. 5C

| | 1 | 2 | 3 | --- |
|---|---|---|---|---|
| ID | | | | --- |
| USER ID | 0001 | 0001 | 0002 | --- |
| SESSION ID | 1000000 | 2000000 | 3000000 | --- |
| CALL DESTINATION ADDRESS | sip:<br>09033333333<br>@sample.com | sip:<br>0322222222<br>@sample.com | sip:<br>09044444444<br>@sample.com | --- |
| CALL DESTINATION ADDRESS DISPLAY NAME | 09033333333 | 0322222222 | 09044444444 | --- |
| CALL DESTINATION NAME | HITACHI TARO | KASHIMADA HANAKO | HITACHI JIRO | --- |
| CALL SOURCE ADDRESS | sip:<br>0311111111<br>@sample.com | sip:<br>0311111111<br>@sample.com | sip:<br>0922222222<br>@sample.com | --- |
| OUTGOING CALL DATE AND TIME | 2010.08.22 10:30 | 2010.08.20 19:00 | 2010.08.25 12:00 | --- |

FIG. 5D

| | 1 | 2 | 3 | |
|---|---|---|---|---|
| 2431~ ID | 1 | 2 | 3 | --- |
| 2432~ USER ID | 0001 | 0001 | 0002 | --- |
| 2433~ SESSION ID | 1111111 | 2222222 | 3333333 | --- |
| 2434~ CALL SOURCE ADDRESS | sip:<br>09044444444<br>@sample.com | sip:<br>09033333333<br>@sample.com | sip:<br>09033333333<br>@sample.com | --- |
| 2435~ CALL SOURCE ADDRESS DISPLAY NAME | 09044444444 | 09033333333 | 09033333333 | --- |
| 2436~ CALL SOURCE NAME | HITACHI JIRO | HITACHI TARO | HITACHI TARO | --- |
| 2437~ ABSENCE INCOMING CALL | true | false | false | --- |
| 2438~ INCOMING CALL DATE AND TIME | 2010.08.22 09:00 | 2010.08.21 16:00 | 2010.08.25 12:00 | --- |

2430

COMMUNICATION SYSTEM AND SERVER

INCORPORATION BY REFERENCE

The present application claims priority from Japanese applications JP2010-252440 filed on Nov. 11, 2010, the content of which is hereby incorporated by reference into this application.

BACKGROUND OF THE INVENTION

The present invention relates to a communication system and a server, and in particularly to a technique for a point-to-point connection method in the next-generation network.

In recent years, researches regarding the next-generation communication network have actively been implemented by telecommunication corporations using IP (Internet Protocol). This type of the next-generation communication network is referred to as NGN (Next Generation Network). In this NGN, a session is secured for between a server and a client, both of which try to communicate with each other, therefore, a method of managing a band for every session is often employed. In also this NGN, there has existed SIP (Session Initiation Protocol) as a session control protocol for use in securing the band, for example.

JP-A-2008-78878 discloses a technique such that a band securing session used for a band security is secured in a band-guarantee type network by replacing a client device with a session substitute device, when the client device, which does not equip a control protocol of the band securing session, communicates with in the band-guarantee type network.

Further, SOAP (Simple Object Access Protocol) for exchanging information between applications has been known.

JP-A-2010-213027 discloses a technique for transferring data for between two parties to be communicated, in NGN on which a communication quality is guaranteed

SUMMARY OF THE INVENTION

In NGN, it is required that an IP address for securing both a signaling channel and a data channel should be the same. To this end, it is impossible to substitute for securing the data channel between two parties (first and second connection terminal) in such a way that they communicate in an existing 3PCC (Third Party Call Control) service flow. In 3PCC service flow, first, the session is secured for between a device equipping 3PCC and the first connection terminal. Next, the session is secured for the device equipping 3PCC and the second connection terminal. When a telephone call occurs between the first connection terminal and the second connection terminal, the session is secured and completed with the first connection terminal to then start the session to be secured with the second connection terminal. Here, in the 3PCC service, a third party, different from the two parties to be communicated with each other, calls the two parties, therefore, a telephone number to be notified is not information of the connection terminal for a communication start source (call source) but becomes information of the third party, when the first or second connection terminal receives an absence incoming call. For this reason, the first or second connection terminal cannot specify the connection terminal of the communication start source, therefore, there is a problem that a return call cannot be made, for example.

According to a first aspect of the invention, a communication system provides a server and a communication device communicated with the server and set a connection between a first terminal and a second terminal by an SIP (Session Initial Protocol), wherein the communication device comprises: a first control unit that receives a connection request from the server; and a second control unit that sets the connection between the first terminal and the second terminal by the SIP protocol when receiving the connection request, and the server comprises: a first memory that stores terminal information of the first terminal and the second terminal; a second memory that stores outgoing call history information of at least either the first terminal or the second terminal; a third memory that stores incoming call history information of at least either first terminal or the second terminal; and a processing unit that reads out the information from the first memory to control at least either the information of the second memory or the third memory in accordance with information contained in a notification from the communication device when setting the connection between at least either the first terminal or the second terminal and the communication device.

According to a second aspect of the invention, a server that controls of setting a connection between a first terminal and a second terminal via a communication device for setting the connection between the first terminal and the second terminal by an SIP protocol, comprising: a first memory that stores terminal information of the first terminal and the second terminal; a second memory that stores outgoing call history information of at least either the first terminal or the second terminal; a third memory that stores incoming call history information of at least either the first terminal or the second terminal; and a processing unit reads out the information from the first memory in accordance with information contained in a notification from the communication device to control the information of at least either the second memory or the third memory when setting the connection between at least either the first terminal or the second terminal and the communication device.

In the 3PCC service, a connected terminal of the communication start source (call source) can be specified and outgoing call history information corresponding to users can also be extracted from other than the specified connected terminal when the outgoing call history information is managed for every user of the connected terminals.

The other objects, features and advantages of the invention will become apparent from the following description of the embodiments of the invention taken in conjunction with the accompanying drawings.

BRIEF DESCRIPTION OF THE DRAWINGS

FIG. 3A is an explanatory diagram showing one configuration example of a session information table in the SOAP-SIP adapter in the embodiment;

FIG. 3B is an explanatory diagram showing one configuration example of a call participant information table in the SOAP-SIP adapter in the embodiment;

FIG. 3C is an explanatory diagram showing one configuration example of a terminal information table in the SOAP-SIP adapter in the embodiment;

FIG. 3D is an explanatory diagram showing one configuration example of a media stream control information table in the SOAP-SIP adapter in the embodiment;

FIG. 4 is a configuration diagram showing a Web server;

FIG. 5A is an explanatory diagram showing one configuration example of a terminal information table in the Web server in the embodiment;

FIG. 5B is an explanatory diagram showing one configuration example of a telephone book table in the Web server in the embodiment;

FIG. 5C is an explanatory diagram showing one configuration example of an outgoing call history information table in the Web server in the embodiment;

FIG. 5D is an explanatory diagram showing one configuration example of an incoming call history information table in the Web server in the embodiment;

DESCRIPTION OF THE EMBODIMENTS (Network Configuration)

Figure 1:
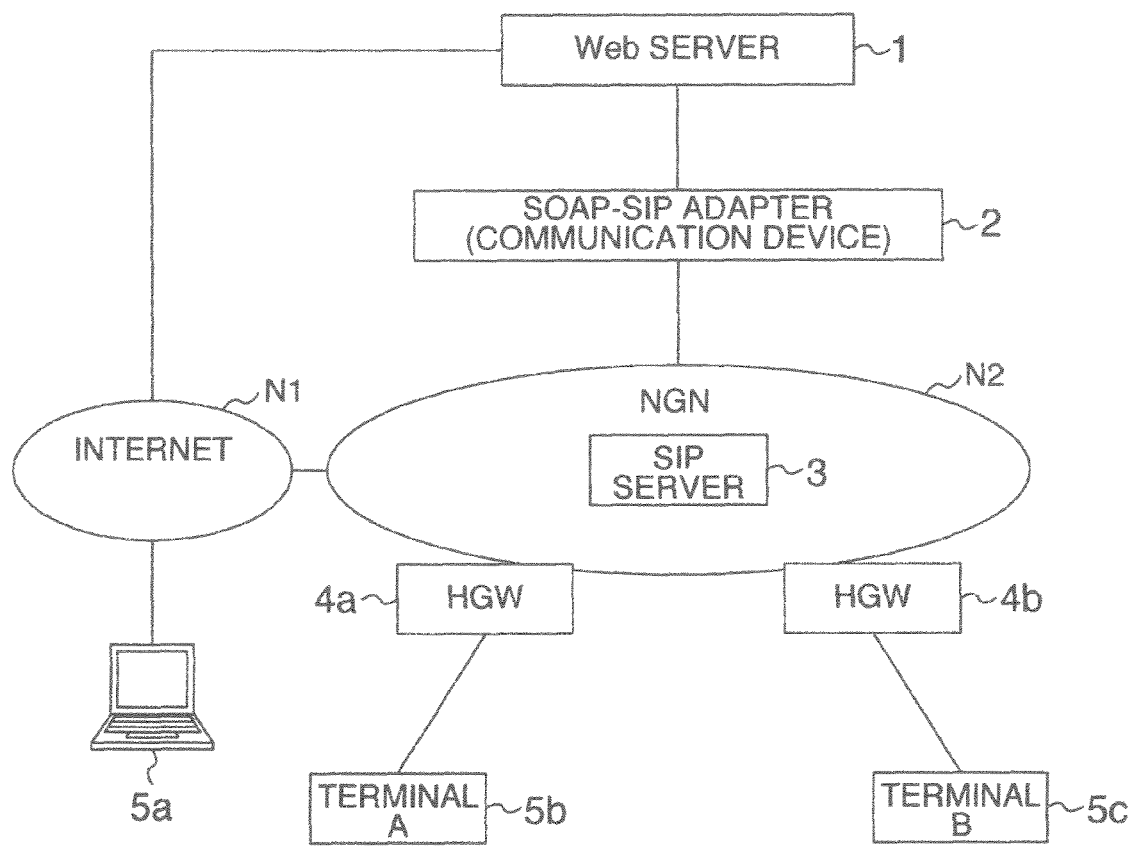
FIG. 1 is an explanatory diagram showing a configuration example of a communication network in one embodiment of the invention.

FIG. 1 is an explanatory diagram showing a configuration example of a communication network in one embodiment.

The communication network (system) provides a Web server 1, an SOAP-SIP adapter (communication device) 2, an SIP server 3, an HGW (Home Gateway) 4a and 4b. The SIP server 3 is installed on an NGN (Next Generation Network) N2, for example.

The Web server 1 communicates with the SOAP-SIP adapter 2 and also communicates with a terminal 5a via a network, such as Internet N1 etc. The Web server 1 further communicates respectively with a terminal A5b via the NGN N2 and HGW 4a and via a network such as the Internet N1 etc., and with a terminal B5c via the NGN N2 and HGW 4b and via a network such as Internet N1 etc. The SOAP-SIP adapter 2 communicates with the terminal A5b via NGN N2 and HGW 4a, as well as with the terminal B5c.

Figure 2:
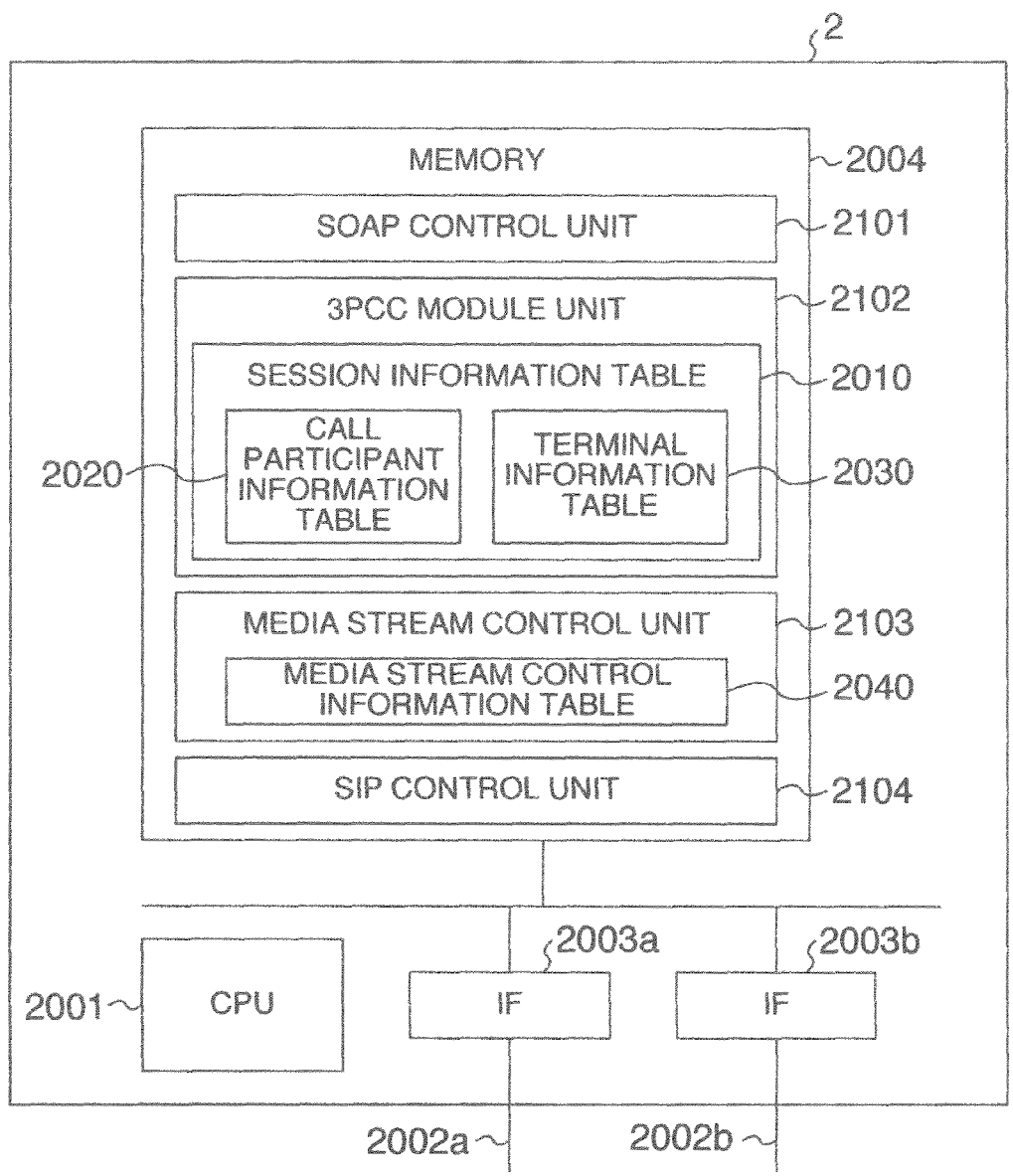
FIG. 2 is an explanatory diagram showing a configuration example in a SOAP-SIP adapter in the embodiment.

FIG. 2 is an explanatory diagram showing a configuration example of the SOAP-SIP adapter 2 in the embodiment.

The SOAP-SIP 2 provides, for example, a processor (hereinafter, CPU) 2001, interfaces (hereinafter, IF) 2003a, 2003b and a memory 2004. The memory 2004 has an SOAP control unit 2101, a 3PCC module unit 2102, a media stream control unit 2103 and an SIP control unit 2104. The 3PCC module unit 2102 has a session information table 2010, and the media stream control unit 2103 has a media stream control information table 2040. The session information table 2010 has a call participant information table 2020 and a terminal information table 2030.

The CPU 2001 implements processes in the SOAP-SIP adapter 2. Specifically, the CPU 2001 manages the SOAP control unit 2101, 3PCC module unit 2102, media stream control unit 2103 and SIP control unit 2104 present on the memory 2004. The IF 2003a, 2003b are used as an interface for communicating respectively with the Web server 1 and NGN N2 via lines 2002a, 2002b.

FIG. 3A is an explanatory diagram showing a configuration example of the session information table 2010 in the SOAP-SIP adapter 2 in the embodiment.

The session information table 2010 stores a session condition 2012, a call participant condition 2020 and terminal information 2030_A, 2030_B in correspondence to a session ID 2011, for example.

The session ID 2011 is a session identifier corresponding to a connection request from the Web server 1 to identify a communication between the terminal A5b and to terminal B5c. The session condition 2012 indicates a session condition indicated by the session ID 2011, including "Initial (initial condition)," "Connected (connection condition)," "Terminated (Termination condition)," etc. The call participant condition 2020 (FIG. 3B) is equivalent to the call participant information table 2020, and the detail of call participant information table 2020 will be described later. The terminal information 2030 (FIG. 3C) is equivalent to the terminal information table 2030, and the terminal information 2030 is stored in every terminal. In an illustrated example, terminal information (used for Client A) 2030_A corresponds to the terminal A5b, and a terminal information (used for Client B) 2030_B corresponds to the terminal B5c. The detail of terminal information table 2030 will be described later.

FIG. 3B is an explanatory diagram showing one configuration example of the call participant information table 2020 in the SOAP-SIP adapter 2 in the embodiment.

The call participant information table 2020 stores a URI 2021, a call condition 2022 and a start time (clock time) 2023 for every terminal.

The URI 2021 indicates an SIP-URI corresponding to a user, and the call condition 2022 indicates the session condition of SIP between the SOAP-SIP adapter 2 and terminals 5b, 5c. The call condition 2022 indicates, for example, "CallParticipantInitial (initial condition)," "CallParticipantConnected (connection condition)," "CallParticipantTerminated (termination condition), etc. The start time 2023 indicates a clock time when the session of SIP is secured for the terminals 5b, 5c by the SOAP-SIP adapter 2.

FIG. 3C is an explanatory diagram showing one configuration example of the terminal information table 2030 in the SOAP-SIP adapter 2 in the embodiment.

The terminal information table 2030 stores, for example, parameters etc. for use in the SIP, including a handle value 2031, a session ID 2032, a terminal condition 2033, a Role 2034, send SDP (Session Description Protocol) information 2035, recv SDP information 2036, a From URI 2037, and a To URI 2038.

The handle value 2031 is information for discriminating respectively the session of SIP between the SOAP-SIP adapter 2 and terminal B5b and of SIP between the SOAP-SIP adapter 2 and terminal B5c. The session ID 2032 corresponds to the session ID 2011 in the above-mentioned session information table 2010. The terminal condition 2033 indicates a condition until the session is secured for between the SOAP-SIP adapter 2 and terminals 5b, 5c. The terminal condition 2033 indicates, for example, "Initial (initial condition)," "ConnectWait (condition where a 'response' is waited for)," "CallComplete (condition where the 'response' is accepted and session with UA is secured)," "CloseWait (condition where a 'shut-down completion notification' is waited for)," "Closed (termination condition)," etc. In addition, the "Initial" and "ConnectWait" correspond to "CallParticipantInitial" of the call condition 2022 stored in the call participant information table 2020. Further, the "CallComplete" and "CloseWait" correspond to "CallParticipantConnected" of the call condition 2022 stored in the call participant information table 2020. The "CloseWait" corresponds to "CallParticipantTerminated" of the call condition 2022.

The Role 2034 is information indicating an outgoing call side and incoming call side. The send SDP information 2035 contains, for example, an IP address and port number of the SOAP-SIP adapter 2. The recv SDP information 2036 contains, for example, the IP address and port number of the terminal A5b or B5c. The From URI 2037 indicates a transmission source URI of an SIP message to be transmitted by the SOAP-SIP adapter 2. The From URI 2037 is also an SIP-URI of the SOAP-SIP adapter 2, for example. The To URI 2038 indicates a transmission destination of the SIP message to be transmitted by the SOAP-SIP adapter 2. The To URI 2038 is the SIP-URI of the terminal A5b or B5c, for example.

FIG. 3D is an explanatory diagram showing a configuration example of the media stream control information table 2040 in the SOAP-SIP adapter 2 in the embodiment.

The media stream control information table 2040 stores, for example, a media stream transmission/reception IP address 2042, a media stream transmission/reception port number 2043, a destination IP address (1) 2044, a destination port number (1) 2045, a destination IP address (2) 2046 and a destination port number (2) 2047, in correspondence to a session ID 2041.

The session ID 2041 corresponds to the session ID 2011 in the session information table 2010. The media stream transmission/reception IP address 2042 and media stream transmission/reception port number 2043 are respectively the IP address and port number of the IFs 2003a, 2003b used for when the SOAP-SIP adapter 2 transfers a media stream. The pairs of the destination IP address (1) 2044/destination port number (1) 2045 and the destination IP address (2) 2046/destination port number (2) 2047 indicate a transfer destination of the media stream. For example, when the transmission source of media stream corresponds to the destination IP address (1) 2044 and destination port number (1) 2045, the media stream is transferred to the corresponding destination IP address (2) 2046 and destination port number (2) 2047 as a transfer destination. Likewise, when the transmission source of media stream corresponds to the destination IP address (2) 2046 and destination port number (2) 2047, the media stream is transferred to the corresponding destination IP address (1) 2044 and destination port number (1) 2045 as a transfer destination. In an illustrated example, the destination IP address (1) 2044 and destination port number (1) 2045 indicate the IP address and port number of the terminal A5b, and the destination IP address (2) 2046 and destination port number (2) 2047 indicate the IP address and port number of the terminal B5c.

FIG. 4 is a configuration diagram of the Web server 1.

The Web server 1 provides, for example, a processing unit 100, an input unit 110, a display unit 120, a storage unit 130 and a communication interface 140. The input unit 110 accepts a session ID and a user identifier, for example, and the display unit 120 displays the user identifier and SIP-URI. The storage unit 130 has a terminal information table (memory) 2400, a telephone book table (memory) 2410, an outgoing call history information table (memory) 2420 and an incoming call history information table (memory) 2430. The communication interface 140 is an interface of communicating with the SOAP-SIP adapter 2, for example. The processing unit 100 implements various processes in the Web server 1, that is, controls (reads out, stores information, updates information, etc.) an after-mentioned terminal information table 2400, telephone book table 2410 and an outgoing call history information table 2420.

FIG. 5A is an explanatory diagram showing a configuration example of the terminal information table 2400 in the Web server 1 in the embodiment. The terminal information table 2400 stores information regarding the individual terminals, each of which corresponds at least to a user ID, a terminal ID and a telephone number. In addition, the information stored in the table may be a combination of all of after-mentioned information or of arbitrary necessary information.

For example, the terminal information table 2400 stores a terminal ID 2402, a terminal name 2403, a telephone number 2404, a correlator 2405 and a terminal registration condition 2406, in correspondence to a user ID 2401.

The user ID 2401 is an identifier for the user who uses the 3PCC service. The terminal ID 2402 is an identifier for a communication terminal possessed by a certain user. Here, one user ID may be corresponded to plural terminals (plural terminal IDs). In FIG. 5A, the user ID 0001 corresponds to a terminal ID 01 as a "fixed terminal" and to a terminal ID 02 as a "mobile terminal." The terminal name 2403 is a name for the communication terminal. The telephone number 2404 indicates a telephone number corresponding to the terminal ID of communication terminal possessed the user. The correlator 2405 is an identifier indicating an association with an event notification from the SOAP-SIP adapter 2. The event notification means a notification in a call setting by the SOAP-SIP adapter 2, and the association with this event notification means parameters for determining whether a handling is necessary for the event notification. The terminal registration condition 2406 indicates a condition whether the event notification is already registered in the SOAP-SIP adapter 2.

FIG. 5B is an explanatory diagram showing one configuration example of the telephone book table 2410 in the Web server 1 in the embodiment. The telephone book table 2410 stores information regarding the individual users, each of which corresponds at least to a user ID, a connection destination designated address (for example, SIP-URI) and a display address (for example, telephone number). Here, the user ID corresponds to a user who holds information of a name 2413, a phonetic symbol 2414, an address 2415 and display address 2416 in a telephone book, but it does not simply relate to the name 2413.

The telephone book table 2410 stores, for example, the user ID 2412, name 2413, phonetic symbol 2414, address 2415 and display address 2416, in correspondence to an ID 2411.

The ID 2411 is an identifier for managing data. The user ID 2412 corresponds to the user ID 2401 in the above-mentioned terminal information table 2400. The name 2413 is a name of the user who uses the 3PCC service and is also information corresponding one-to-one to the user ID 2412. The phonetic symbol 2414 is information corresponding one-to-one to the name 2413 to be able to use by a sort when displaying the telephone book. The address 2415 indicates the SIP-URI of the users, and the display address is information, for example a telephone number, to be displayed on the terminal which refers to the telephone book, among the contents in the address 2415.

FIG. 5C is an explanatory diagram of one configuration example of the outgoing call history information table 2420 in the Web server 1 in the embodiment. The outgoing call history information table 2420 stores information regarding the individual outgoing calls, each of which corresponds at least to the user ID, session ID, call destination information, call source information and outgoing call time information. In addition, the information stored in the table may be a combination of all of after-mentioned information or of arbitrary necessary information.

For example, the outgoing call history information table 2420 stores a user ID 2422, a session ID 2423, a call destination address 2424, a call destination address display name 2425, a call destination name 2426, a call source address 2427 and an outgoing call date and time 2428, in correspondence to an ID 2421.

The ID 2421 is an identifier for managing data. The user ID 2422 corresponds to the user ID 2401 in the above-mentioned terminal information table 2400. The session ID 2423 corresponds to the session ID 2011 in the above-mentioned session information table 2010. The call destination address 2424 is a terminal as an incoming call side, for example, the SIP-URI of terminal B5c. The call destination address display name 2425 is information, for example a telephone number, displayed on the terminal which refers to an outgoing call history, among the contents in the call destination address 2424. The call destination name 2426 corresponds to the name 2413 in the above-mentioned telephone book table 2410. The call source address 2427 is for the terminal as outgoing call side, for example, the SIP-URI of the terminal A5b. The outgoing call date and time 2428 is time information at a time of the outgoing call by a telephone.

FIG. 5D is an explanatory diagram showing one configuration example of the incoming call history information table 2430 in the Web server 1 in the embodiment. The incoming call history information table 2430 stores information regarding the individual incoming calls, each of which corresponds at least to the user ID, session ID, call source information and incoming call time information. In addition, the information stored in the table may be a combination of all of after-mentioned information or of arbitrary necessary information.

For example, the incoming call history information table 2430 stores a user ID 2432, a session ID 2433, a call source address 2434, a call source address display name 2435, a call source name 2436, an absence incoming call 2437 and an incoming call date and time 2438, in correspondence to an ID 2431.

The ID 2431 is an identifier for managing data. The user ID 2432 corresponds to the user ID 2401 in the above-mentioned terminal information table 2400. The session ID 2433 corresponds to the session ID 2011 in the above-mentioned session information table 2010. The call source address 2434 is for the terminal as outgoing call side, for example, the SIP-URI of terminal A5b. The call source address display name 2435 is information, for example a telephone number, displayed on the terminal which refers to an incoming call history, among the contents in the call source address 2434. The call source name 2436 corresponds to the name 2413 in the above-mentioned telephone book table 2410. The absence incoming call 2437 indicates a response condition from the incoming call on a destination terminal at a time of the call request. The incoming call date and time 2438 is time information at a time of the incoming call by the telephone.

(Operation)

Figure 6:
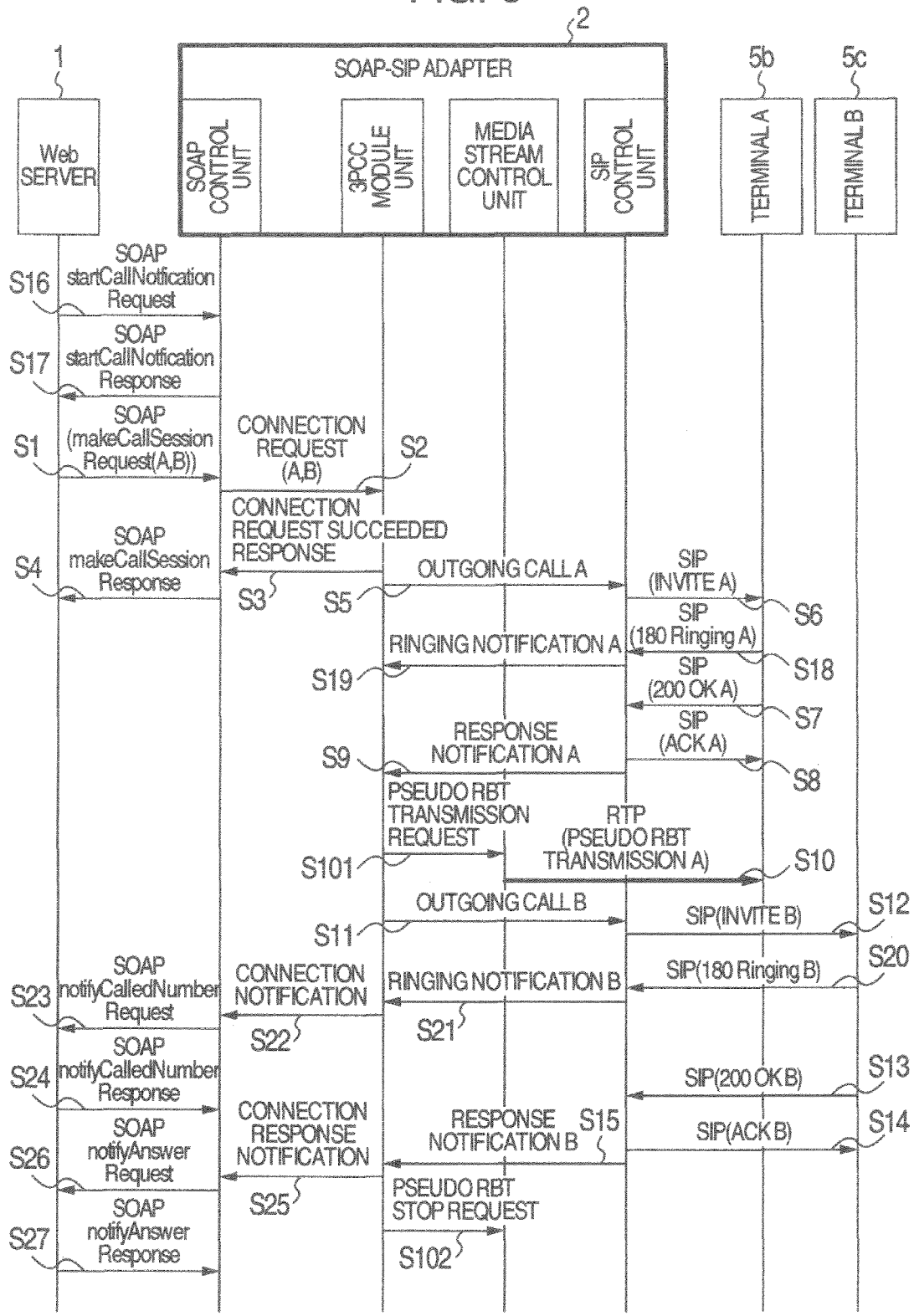
FIG. 6 is a sequence diagram for explaining a procedure of generating the outgoing call history information in a 3PCC service.
Figure 7:
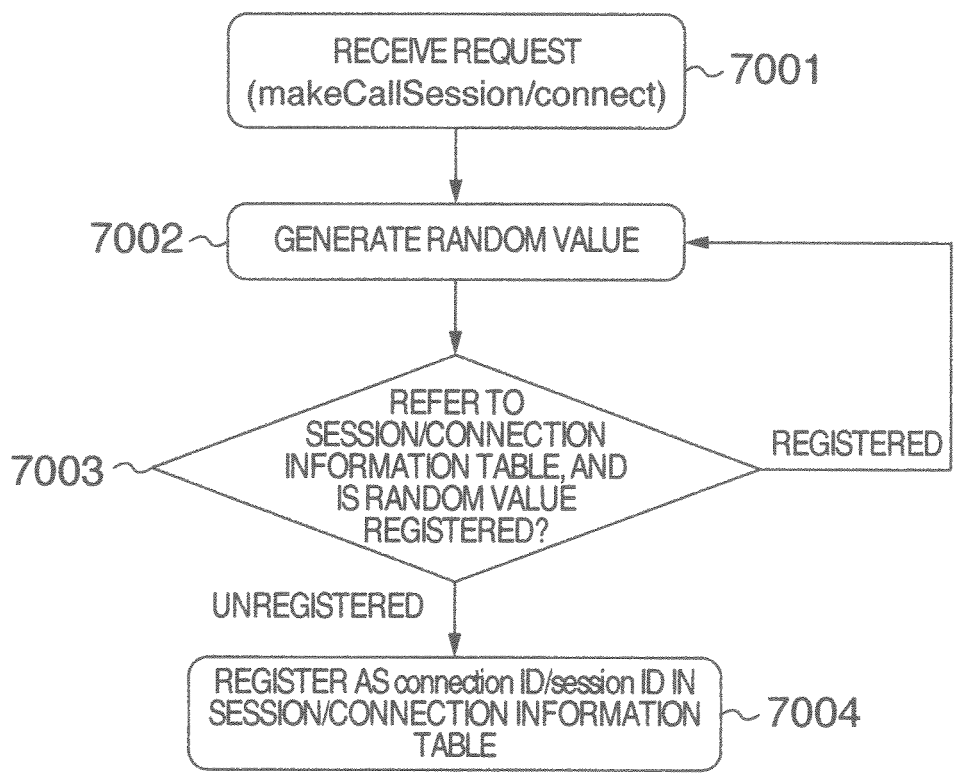
FIG. 7 is a flowchart for explaining a generation of a session ID and connection ID in the SOAP-SIP adapter.
Figure 8:
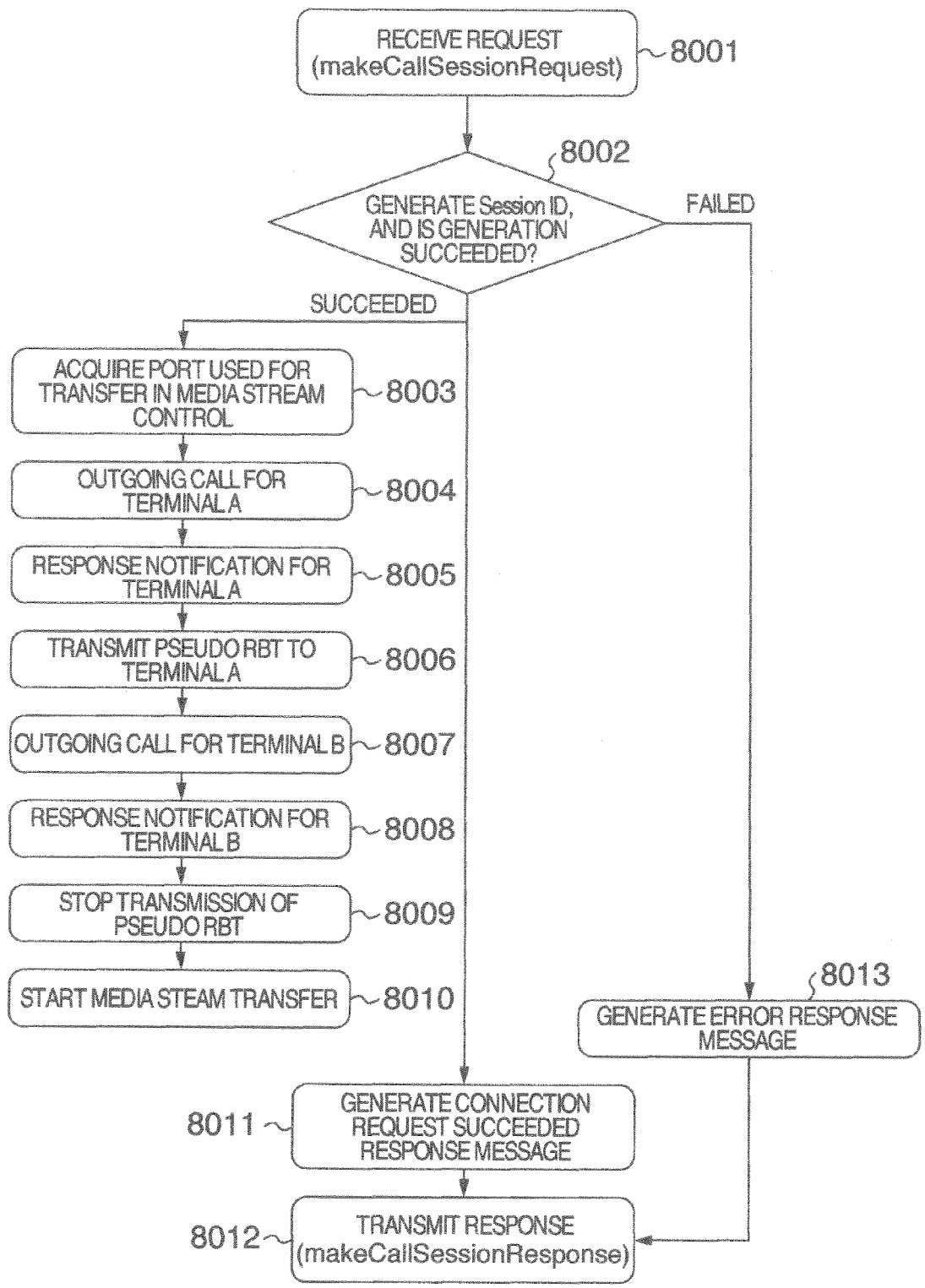
FIG. 8 is a flowchart for explaining an operation at a time of receiving a call start request in the SOAP-SIP adapter in the embodiment.
Figure 16:
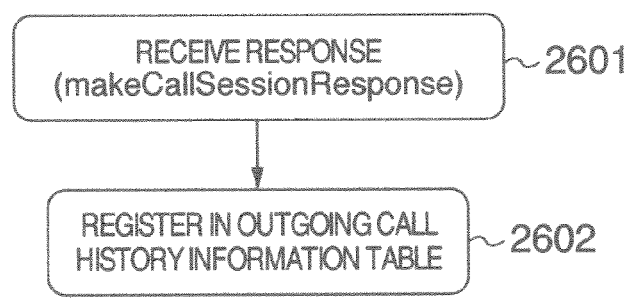
FIG. 16 is a flowchart for explaining an operation of generating an outgoing call history in the Web server.
Figure 17:
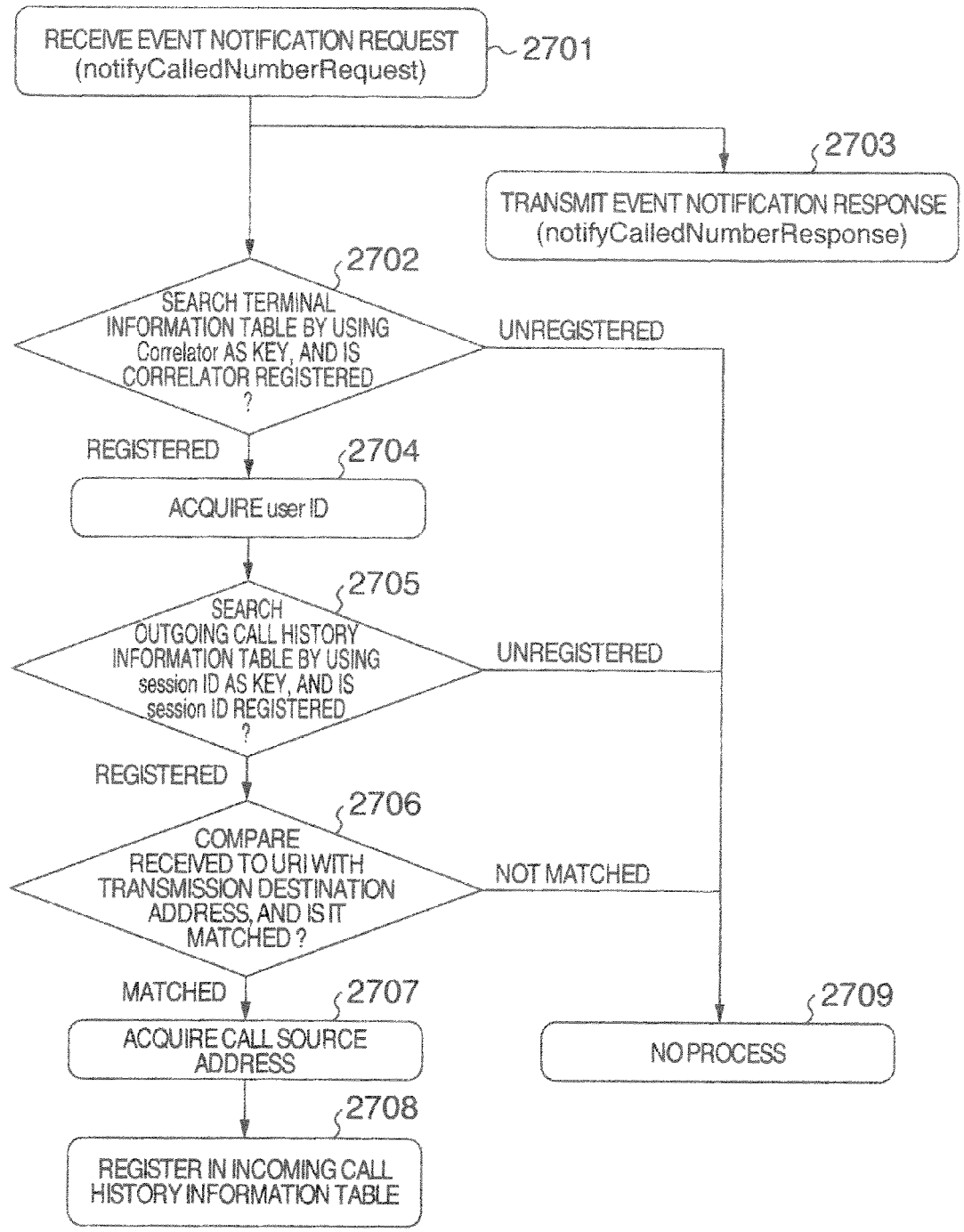
FIG. 17 is a flowchart for explaining an operation of generating an incoming call history in the Web server.
Figure 18:
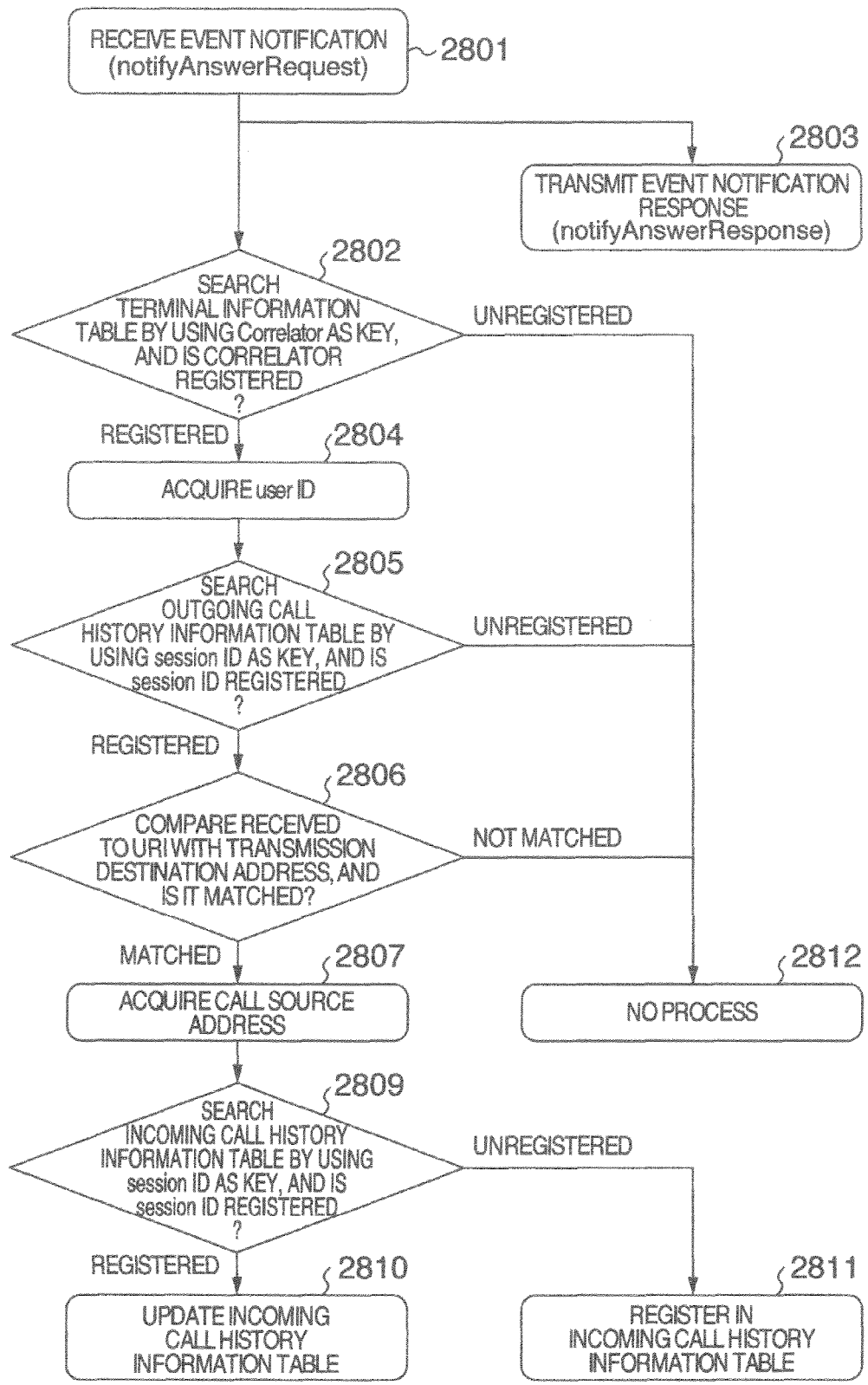
FIG. 18 is a flowchart for explaining an operation at a time of generating the incoming call history in the Web server.

FIG. 7 is a flowchart for explaining a generation of the session ID/connection ID in the SOAP-SIP adapter 2. In addition, the connection ID is a parameter which can be used for when the connection is not applicable to the 3PCC, but to the NGN connection. FIG. 8 is a flowchart for explaining an operation at a time of receiving a call start request in the SOAP-SIP adapter 2 in the embodiment. Further, FIG. 6 is a sequence diagram for explaining a procedure of generating the outgoing and incoming call history information in the 3PCC service. FIG. 16 is a flowchart for explaining an operation of generating the outgoing call history in the Web server 1. FIG. 17 and FIG. 18 are a flowchart for explaining an operation of generating the incoming call history in the Web server 1

In this embodiment, a connection terminal of communication start source (call source) can be specified in the 3PCC service. Further, the outgoing and incoming call history information corresponding to the respective users is extracted from other than the specific connection terminals when managing the outgoing and incoming call history information for every user of the connection terminals. The telephone book for a Web management can also be supplied.

The procedure up to the 3PCC including the generation of outgoing and incoming history information becomes the following procedure (a) to (e). (a) The SIP-URI etc. of an outgoing and incoming call history-generation targeted user is registered from the Web server 1 to the SOAP-SIP adapter 2. (b) The session is secured for between the SOAP-SIP adapter 2 and the first connection terminal A5b. (c) The outgoing call history information of first connection terminal A5b is generated in the Web server 1. (d) The session is secured for between the SOAP-SIP adapter 2 and second connection terminal B5c. (e) The incoming call history information of second connection terminal B5c is generated in the Web server 1. (f) The telephone call is implemented with between the first connection terminal A5b and the second connection terminal B5c. However, a silence condition occurs in the first connection terminal A5b at a time when the procedure (b) is completed and (d) starts. In this case, a pseudo version of an RBT (Ringing Back Tone or connection maintaining message) is transmitted to the first connection terminal A5b from the SOAP-SIP adapter 2.

In the NGN, there is a requirement that the IP address should be the same for securing a signaling channel and a data channel, therefore, it is impossible to substitute for securing the data channel between two parties (between first connection terminal A5b and second connection terminal B5c) in such a way that they communicate in the existing 3PCC service flow. In this point, data from the first connection terminal A5b is received by the SOAP-SIP adapter 2 to transfer the data to the second connection terminal B5c, in this embodiment. The SOAP-SIP adapter 2 receives the data from the second connection terminal B5c to then transfer the data to the first connection terminal A5b. The SOAP-SIP adapter 2 also generates the media stream control information table 2040 for realizing the above-mentioned transfer.

Further, the SOAP-SIP adapter 2 as a third party, different from the two parties (first connection terminal A5b and second connection terminal B5c) to be communicated with each other, calls the two parties in the 3PCC service, therefore, a telephone number to be notified becomes information of the SOAP-SIP adapter 2, when the first connection terminal A5b or second connection terminal B5c receives the absence incoming call. For this reason, the first or second connection terminal cannot specify the connection terminal of the communication start source (call source), therefore, there is a problem that a return call cannot be made. Consequently, the outgoing and incoming call history information in the 3PCC service is generated on the Web server 1, in this way, the outgoing and incoming call history information corresponding to user information (log in ID etc.) to be necessary for the communication is provided for the terminal communicable with the Web server 1.

A procedure of this embodiment will be described below with reference to the sequence diagram and flowchart.

The sequence flow will be described with reference to FIG. 6. First, a manager of the Web server 1 logs in the Web server 1, and information of the user etc. who uses the 3PCC is entered to register in the terminal information table 2400. For example, registered contents contains the user ID 2401, terminal ID 2402 for discriminating plural terminals, terminal name 2403, telephone number 2404 and correlator 2405. Next, the Web server 1 transmits an SOAP startCallNotificationRequest (notification start request) to the SOAP-SIP adapter 2, at a step S16. The SOAP startCallNotificationRequest contains the SIP-URI corresponding to the user who is targeted of the notification request of connection condition and the correlator as a value for indicating an association. The SOAP-SIP adapter 2 transmits an SOAP startCallNotificationResponse (notification start response) received, at a step S17. The Web server 1 updates the terminal registration condition 2406 in the terminal information table 2400 from "unregistered" to "registered" (an initial value is "unregistered") in response to the reception of the SOAP startCallNotificationResponse. Next, the user as a third party or the manager for Web server 1 operates the terminal 5a to log in the Web server 1. The Web server 1 receives, from the terminal 5a, an identifier (user ID corresponding to the user who uses the terminals A5b or B5c, for example) of the user to be communicated. For example, the users of two parties to be communicated may be selected by operation of the user, along with a screen displaying the logged in terminal 5a, in the Web server 1.

The Web server 1 transmits an SOAP makeCallSessionRequest (connection request) to the SOAP-SIP adapter 2, at a step S1. The SOAP makeCallSessionRequest contains the SIP-URI corresponding to the users of connection request targeted two parties. The Web server 1 acquires the SIP-URI corresponding to the user identifier (user ID) entered by searching the telephone book table 2410 in which the user identifier (user ID) is stored correspondingly to the SIP-URI of the user. The Web server 1 also generates the SOAP makeCallSessionRequest containing the acquired SIP-URI to transmit to the SOAP-SIP adapter 2. The SOAP-SIP adapter 2 starts the connection to the terminals 5b, 5c each of which corresponds to the SIP-URI contained in the received SOAP makeCallSessionRequest to transmit an SOAP makeCallSessionResponse containing the session ID generated by the SOAP-SIP adapter 2, at steps S2 to S15. At this time, the Web server 1 registers the outgoing call history in the outgoing call history information table 2420 for the first connection terminal A5b corresponding to the user information (SIP-URI) determined as the call source address, among the piece of user information (SIP-URI) of the connection request targeted two parties contained in the SOAP makeCallSessionRequest.

For example, the outgoing call history information table 2420 contains the session ID 2423, call destination address (SIP-URI of the second connection terminal A5c) 2424, call destination address display name 2425, call destination name 2426, call source address (SIP-URI of the first connection terminal A5b) 2427 and outgoing call date and time 2428, contained in the SOAP makeCallSessionResponse.

Further, the Web server 1 receives an SOAP notifiyCalledNumberRequest from the SOAP-SIP adapter 2 at a step S23 and an SOAP notifyAnswerRequest at a step S26. At this time, the Web server 1 transmits an SOAP notifyCalledNumberResponse to the SOAP-SIP adapter 2, at a step S24 and an SOAP notifyAnswerResponse to the same, at a step S27. As described later, the Web server 1 registers the incoming call history in the incoming call history information table 2430, for the second connection terminal A5c corresponding to the user information (SIP-URI) determined as the call destination address, among the piece of user information (SIP-URI) of the connection request targeted two parties contained in the SOAP makeCallSessionRequest, at steps S18 to S27. For example, the incoming call history information table 2430 contains the session ID 2433, call source address (SIP-URI of the first connection terminal A5b) 2434, call source address display name 2435, call source name 2436, absence incoming call flag 2437 and incoming call date and time 2438, contained in the SOAP makeCallSessionResponse.

Hereinafter, a detailed operation of the steps S2 to S15 and S18 to S27 regarding the SOAP-SIP adapter 2 will be described below.

The SOAP control unit 2101 in the SOAP-SIP adapter 2 receives the SOAP makeCallSessionRequest to transmit the connection request to the 3PCC module unit 2102, at the step S2. This connection request can be generated from an appropriate protocol for use in the SOAP-SIP adapter 2 on the basis of the SOAP makeCallSessionRequest received, for example, and also contains SIP-URI in the SOAP makeCallSessionRequest.

The 3PCC module unit 2102 receives the connection request at steps 7001, 8001 to generate the session ID at a step 8002. A generation of the session ID will be described below with reference to FIG. 7.

The 3PCC module unit 2102 receives the connection request to generate a random value at a step 7002. The 3PCC module unit 2102 determines whether the generated random value is registered in the session ID 2011 in the session information table 2010 at a step 7003. If the generated random value is already registered (or already used) therein, the process in 3PCC module unit 2102 returns to the step 7002 to repeat subsequently necessary processes. In contrast, if the generated random value is unregistered, the 3PCC module unit 2102 stores the generated session ID in the session information table 2010 at a step 7004. Further, the 3PCC module unit 2102 sets the session condition 2012 in the session information table 2010 to "Initial (initial condition)".

The 3PCC module unit 2102 also stores the SIP-URI contained in the received connection request in the call participant information table 2020. The call participant information table 2020 in FIG. 3B as an example, stores the SIP-URI (refer to 2020_A) of the terminal A5b and SIP-URI (refer to 2020_B) of the terminal B5c. The 3PCC module unit 2102 sets the call condition 2022 corresponding to the terminals 5b, 5c in the call participant information table 2020 to "CallParticipantInitial (initial condition)".

The 3PCC module unit 2102 stores the terminal information of the terminals A5b, B5c. Specifically, the 3PCC module unit 2102 makes the generated session ID correspond to the terminals 5b, 5c to store in the terminal information table 2030. The 3PCC module unit 2102 also stores the respective SIP-URIs contained in the received connection request in the To URI 2038 corresponding to the respective terminals 5b, 5c in the terminal information table 2030. The 3PCC module unit 2102 sets respectively the terminal condition 2033 corresponding to the terminals 5b, 5c in the terminal information table 2030 to "Initial (initial condition)". The 3PCC module unit 2102 sets respectively information indicating the outgoing call side or incoming call side to the Role 2033 corresponding to the terminals 5b, 5c in the terminal information table 2030. In addition, either the terminal 5b or 5c can be set appropriately to the outgoing call side. The 3PCC module unit 2102 also stores the IP address and port number of SOAP-SIP adapter 2 in the send SDP information 2035 in the terminal information table 2030. The 3PCC module unit 2102 also stores the SIP-URI of SOAP-SIP adapter 2 in the From URI 2037 corresponding to the terminals 5b, 5c in the terminal information table 2030. In addition, the SIP-URI, IP address and port number of SOAP-SIP adapter 2 are stored in an appropriate storage unit in advance.

The 3PCC module unit 2102 generates a connection request succeeded response to transmit to the SOAP control unit 2101, at the step S3 and a step 8011. The connection request succeeded response contains the generated session ID. The SOAP control unit 2101 receives the connection request succeeded response to transmit the SOAP makeCallSessionResponse to the Web server 1, at the step S4 and a step 8012. The SOAP makeCallSessionResponse contains the generated session ID and is generated in accordance with the SOAP on the basis of the received connection request succeeded response. The Web server 1 receives the SOAP makeCallSessionResponse to store the session ID contained in the SOAP makeCallSessionResponse in an appropriate storage unit.

In addition, if the generation for session ID is failed at the step 8002, the 3PCC module unit 2102 generates a connection request failed response (error response message) at a step 8013 to transmit to the SOAP control unit 2101. The SOAP control unit 2101 receives the connection request failed response to transmit the makeCallSessionResponse to the Web server 1 at the step 8012.

Next, the session is secured for between the SOAP-SIP adapter 2 and terminal A5b.

More specifically, the 3PCC module unit 2102 acquires a port used for a media stream control/transfer at a step 8003 and transmits an outgoing call request (A) for the terminal A5b to the SIP control unit 2104 at the step S5 and a step 8004. For example, the 3PCC module unit 2102 transmits, to the SIP control unit 2104, the outgoing call request containing the send SDP information 2035, From URI 2037 and To URI 2038, corresponding to the terminal A5b, stored in the terminal information table 2030. The 3PCC module unit 2102 also sets a clock time at this time, as one example, to the start time 2023 corresponding to the terminal A5b in the call participant information table 2020. The call participant information table 2020 shown, as an example, in FIG. 3B stores "2010.08.22 10:30.30". In addition, the start time 2023 is not limited to the clock time at this time, may also be an appropriate clock time indicating the start of session with the terminal A5b.

The SIP control unit 2104 transmits an INVITE message (A) to the terminal A5b in accordance with the To URI contained in the outgoing call request (A) at the step S6. The INVITE message (A) contains at least the send SDP information, From URI and To URI, contained in the received outgoing call request, for example. The SIP control unit 2104 also generates the handle value for discriminating the session with the terminal A5b.

The terminal A5b receives the INVITE message (A) to store, in an appropriate storage unit, the IP address and port number of SOAP-SIP adapter 2 contained in the send SDP information of the received INVITE message (A). The stored IP address and port number are used for when transmitting the media stream, for example. The terminal A5b generates the recv SDP information containing the own IP address and port number to transmit a (200 OK) (A) of SIP containing the generated recv SDP information to the SOAP-SIP adapter 2 at the step S7. The SIP control unit 2104 in the SOAP-SIP adapter 2 receives the (200 OK) (A) to transmit an SIP (ACK A) to the terminal. A5b at the step S8.

The SIP control unit 2104 transmits the response notification (A) to the 3PCC module unit 2102, at the step S9 and at a step 8005. The response notification (A) contains the handle value generated at the step S6 and the recv SDP information 2036 of terminal A5b contained in the SIP 200 OK received at the step S7. The 3PCC module unit 2102 makes the handle value and recv SDP information contained in the received response notification (A) correspond to the terminal A5b and store in the terminal information table 2030. In addition, the handle value may be stored at an appropriate timing between the steps S6 to S8. The 3PCC module unit 2102 updates the terminal condition 2033 corresponding to the terminal A5b in the terminal information table 2030 to "CallComplete (session secured condition)". The 3PCC module unit 2102 also updates the call condition 2022 corresponding to the terminal A5b in the call participant information table 2020 to "CallParticipantConnected (connection condition)". In addition, the terminal condition 2033 may be updated appropriately in response to the transmission/reception of the SIP message (for example, 200 OK, etc.).

The 3PCC module unit 2102 also transmits the generated session ID, IP address and port number of the SOAP-SIP adapter 2 and IP address and port number of the terminal A5b contained in the received recv SDP information to the media stream control unit 2103. The media stream control unit 2103 stores respectively the received pieces of information in the media stream control information table 2040. For example, the media stream control unit 2103 stores the received IP address and port number of the SOAP-SIP adapter 2 in both the media stream transmission/reception IP address 2042 and the media stream transmission/reception port number 2043 and also stores the received IP address and port number of the terminal A5b in the both the destination IP address (1) 2044 and destination port number (1) 2045. The media stream control unit 2103 also stores the received session ID therein.

The 3PCC module unit 2102 transmits the pseudo RBT transmission request to the media stream control unit 2103 at a step S101. The media stream control unit 2103 receives the pseudo RBT transmission request to transmit the pseudo RBT to the terminal A5b in accordance with an RTP (Real-time Transport Protocol), for example, at the step S10 and a step 8006. The media stream control unit 2103 may use an announcement indicating that a destination is being accessed, appropriate music sound, etc. as used for the pseudo RBT.

Next, the session is secured for between the SOAP-SIP adapter 2 and terminal B5c.

The 3PCC module unit 2102 transmits an outgoing call request (B) for the terminal B5c to the SIP control unit 2104 at the step S11 and a step 8007. For example, the 3PCC module unit 2102 transmits, to the SIP control unit 2104, the outgoing call request containing the send SDP information 2035, From URI 2037 and To URI 2038 corresponding to the terminal B5c stored in the terminal information table 2030. The 3PCC module unit 2102 also sets a clock time at this time to the start time 2023 corresponding to the terminal B5c in the call participant information table 2020. The call participant information table 2020 shown in FIG. 3B stores "2010.10.08. 10:30.45".

The SIP control unit 2104 transmits an INVITE message (B) to the terminal B5c in accordance with the To URI contained in the outgoing call request (B) at the step S12. The INVITE message (B) contains at least the send SDP information, From URI and To URI contained in the received outgoing call request, for example. The SIP control unit 2104 also generates the handle value for discriminating the session with the terminal B5c.

The terminal B5c receives the INVITE message (B) to store, in an appropriate storage unit, the IP address and port number of SOAP-SIP adapter 2 contained in the send SDP information of the received INVITE message (B).

The terminal B5c also transmits an SIP 180 Ringing (calling notification) indicating that it is being called, to the SOAP-SIP adapter 2 at the step S20. The SIP control unit 2104 in SOAP-SIP adapter 2 receives the SIP 180 Ringing to transmit a ringing notification to the 3PCC module unit 2102, at the step S21. Thereafter, the 3PCC module unit 2102 transmits the connection notification to the SOAP control unit 2101 at the step S22, and the SOAP control unit 2101 then transmits the SOAP notifyCalledNumberRequest (connection notification, connection notification event) to the Web server 1 at the step S23. The SOAP notifyCalledNumberRequest contains the correlator, From URI, To URI and session ID, for example. At this time, the Web server 1 searches the terminal information table 2400 by using the received correlator as a key to acquire the user ID 2401. Next, the outgoing call history information table 2420 is searched by using the received session ID as a key, the call destination address 2424 is compared with the received To URI, and the call source address 2427 is acquired if they are equivalent. The user ID and call source address acquired by the above-mentioned manner are registered in the incoming call history information table 2430. The call source display address and name acquired by searching the telephone book table 2410 by using either the received correlator or session ID as a key, may be registered, or registered together with the corresponding session ID to the call source display address and name. At this time, the absence incoming call flag is not updated (initial value is "true" in the absence incoming call flag, which becomes an absence incoming call condition).

When the registration in the incoming call history information table 2430 is implemented by using the SIP 180 Ringing as a trigger, the generation of incoming call history information can be realized in real time since the condition is that the terminal is being called demonstratively. Here, the SIP 180 Ringing is used as a trigger for registering in the incoming call history information table 2430, however, the session connection process to the terminal can be set to a trigger. That is, an action of the connection process to the terminal is used as a trigger, or the INVITE may also be used as a trigger. When the INVITE is used as a trigger, the registration in the incoming call history information table can be implemented even though the terminal B5c stays on a condition (power source is OFF or the terminal is in out of service) where the telephone call cannot be made by any reason.

When the call destination address 2424 is different from the received To URI as result of searching the outgoing call history information by using the session ID as a key, the SOAP notifyCalledNumberRequest may be discarded. That is, it is determined that the incoming call history information is not targeted for the generation and update when the call destination address is different from the received To URI. For example, this case is that the receive To URI is equivalent to the call source address.

The Web server 1 transmits the SOAP notifyCalledNumberResponse to the SOAP control unit 2101 in response to the SOAP notifyCalledNumberRequest at the step S24. The terminal B5c generates the recv SDP information containing own IP address and port number to transmit the SIP 200 OK (B) containing the generated recv SDP information to the SOAP-SIP adapter 2 at the step S13. The SIP control unit 2104 in SOAP-SIP adapter 2 receives the SIP 200 OK (B) to transmit an SIP ACK (B) to the terminal B5c at the step S14.

The SIP control unit 210 transmits the response notification (B) to the 3PCC module unit 2102 at the step S15 and a step 8008. The response notification (B) contains the handle value generated at the step S12 and the recv SDP information of the terminal B5c contained in the received SIP 200 OK at the step S13. The 3PCC module unit 2102 makes the handle value and recv SDP information contained in the received response information (B) correspond to the terminal B5c and store in the terminal information table 2030. In addition, the handle value may be stored at an appropriate timing between the steps S12 to S14. The 3PCC module unit 2102 updates the terminal condition 2033 corresponding to the terminal B5c in the terminal information table 2030 to "CallComplete (session secured condition)". The 3PCC module unit 2102 also updates the call condition 2022 corresponding to the terminal B5c in the call participant information table 2020 to "CallParticipantConnected (connection condition)". The 3PCC module unit 2102 further updates the session condition in the session information table 2010 to "Connected (connection condition)".

Next, the 3PCC module unit 2102 transmits a connection response notification to the SOAP control unit 2101 at the step S25, and the SOAP notifyAnswerRequest (response notification, response notification event) to the Web server 1 at the step S26. The SOAP notifyAnswerRequest contains the correlator, From URI, To URI and session ID, for example. At this time, the Web server 1 searches the terminal information table 2400 by using the received correlator as a key to acquire the user ID 2401. Next, the outgoing call history information table 2420 is searched by using the received session ID as a key to compare the call destination address 2424 with the received To URI. If they are equivalent, the call source address 2427 is acquired. Subsequently, the incoming call history information table 2430 is searched by using the received session ID as a key to update the absence incoming call flag to "false", that is, to a normal incoming call condition. If there is no incoming call history, a new registration is implemented for the incoming call history information table 2430. If the call destination address 2424 is different from the received To URI, the call source address 2427 is discarded. The Web server 1 then transmits the SOAP notifyAnswerResponse to the SOAP control unit 2101 in response to the SOAP notifyAnswerRequest at the step S27.

The 3PCC module unit 2102 transmits the session ID and IP address and port number of the terminal B5c contained in the received recv SDP information to the media stream control unit 2103. The media stream control unit 2103 stores the IP address and port number of terminal B5c in the destination IP address (2) 2046 and destination port number (2) 2047 in the media stream control information table 2040, in correspondence to the received session ID.

The 3PCC module unit 2102 transmits a pseudo RBT stop request to the media stream control unit 2103 at a step S102 and a step 8009. The media stream control unit 2103 stops the transmission of pseudo RBT in accordance with the pseudo RBT stop request.

The SOAP-SIP adapter 2 starts a media stream transfer for between the terminals A5b and B5c at a step 8010.

Figure 12:
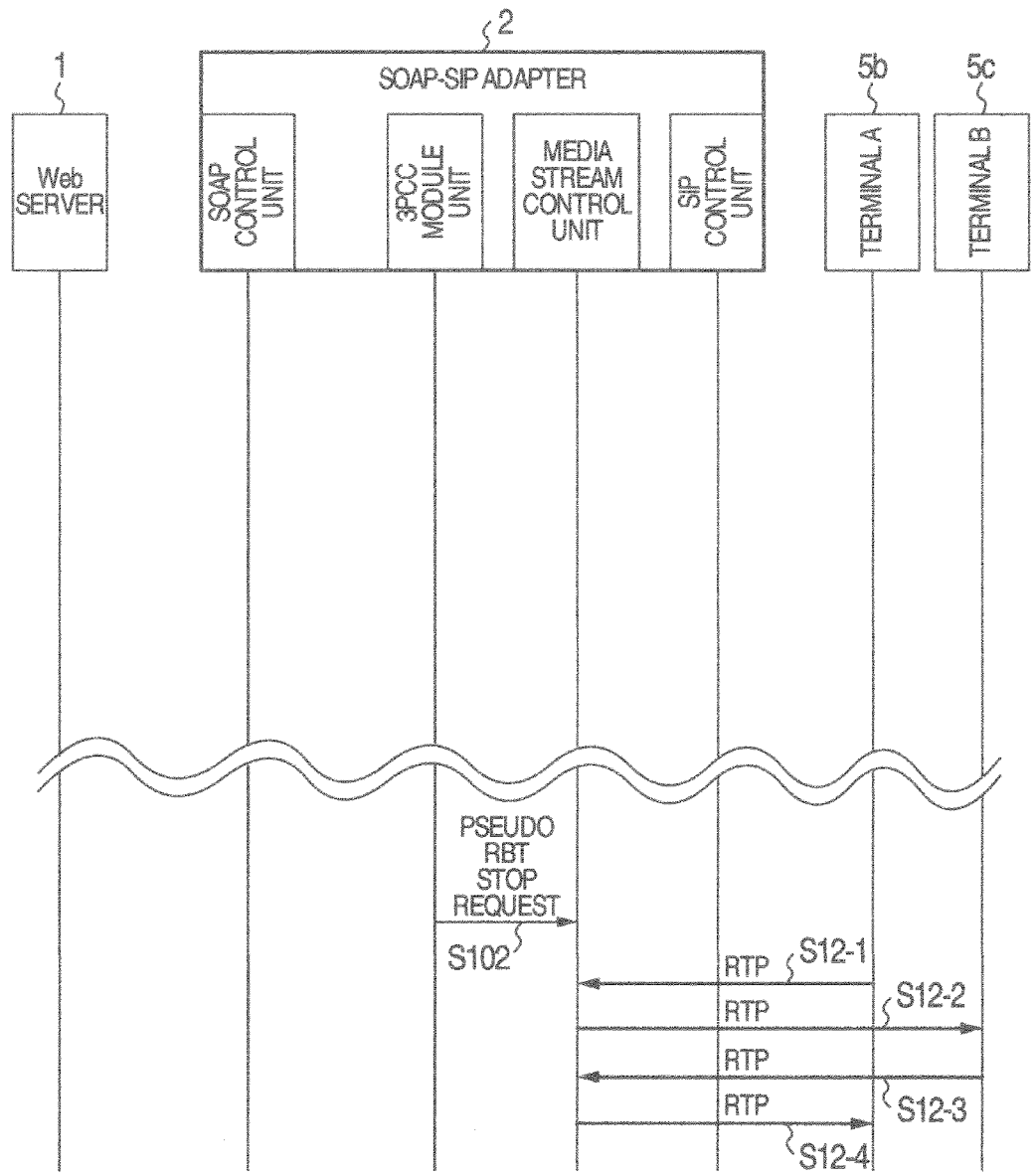
FIG. 12 is a sequence diagram for explaining a media stream transfer in the embodiment.

FIG. 12 is a sequence diagram regarding the media stream transfer. This sequence is implemented at least for the step S102 and subsequent steps shown in FIG. 6. For example, the terminal A5b transmits the media stream to the SOAP-SIP adapter 2 in accordance with the RTP at a step S12-1. At this time, the terminal A5b sets the IP address and port number of SOAP-SIP adapter 2 stored at the step S6 to the destination to then set the own IP address and port number to a transmission source.

The media stream control unit 2103 in SOAP-SIP adapter 2 refers to the media stream control information table 2040 to transfer the received media stream to the terminal B5c at a step S12-2. For example, the media stream control unit 2103 refers to the media stream control information table 2040 on the basis of the transmission source IP address and port number of the received media stream to acquire corresponding destination IP address and port number. In the example of media stream control information table 2040 shown in FIG. 3D, the transmission source IP address and port number of the received media stream correspond respectively to the IP address (10.0.2.1) and port number (20000) of terminal A5b to acquire the corresponding destination IP address (2) 2046 (10.0.2.2) and port number (2) 2047 (30000). The media stream control unit 2103 transfers the received media stream to the terminal B5c in accordance with the acquired IP address and port number.

Likewise, the terminal B5c transmits the media stream to the SOAP-SIP adapter 2 in accordance with the RTP at a step S12-3. Likewise to the terminal A5b, the terminal B5c sets the IP address and port number of SOAP-SIP adapter 2 stored at the step S12 to the destination to set the own IP address and port number to the transmission source.

The media stream control unit 2103 in SOAP-SIP adapter 2 refers to the media stream control information table 2040 to transfer the received media stream to the terminal A5b at a step S12-4. In the example of media stream control information table 2040 shown in FIG. 3D, the transmission source IP address and port number of the received media stream correspond respectively to the IP address (10.0.2.2) and port number (30000) of the terminal B5c to acquire the corresponding destination IP address (1) 2044 (10.0.2.1) and port number (1) 2045 (20000). The media stream control unit 2103 transfers the received data stream to the terminal A5b in accordance with the acquired IP address and port number.

Figure 9:
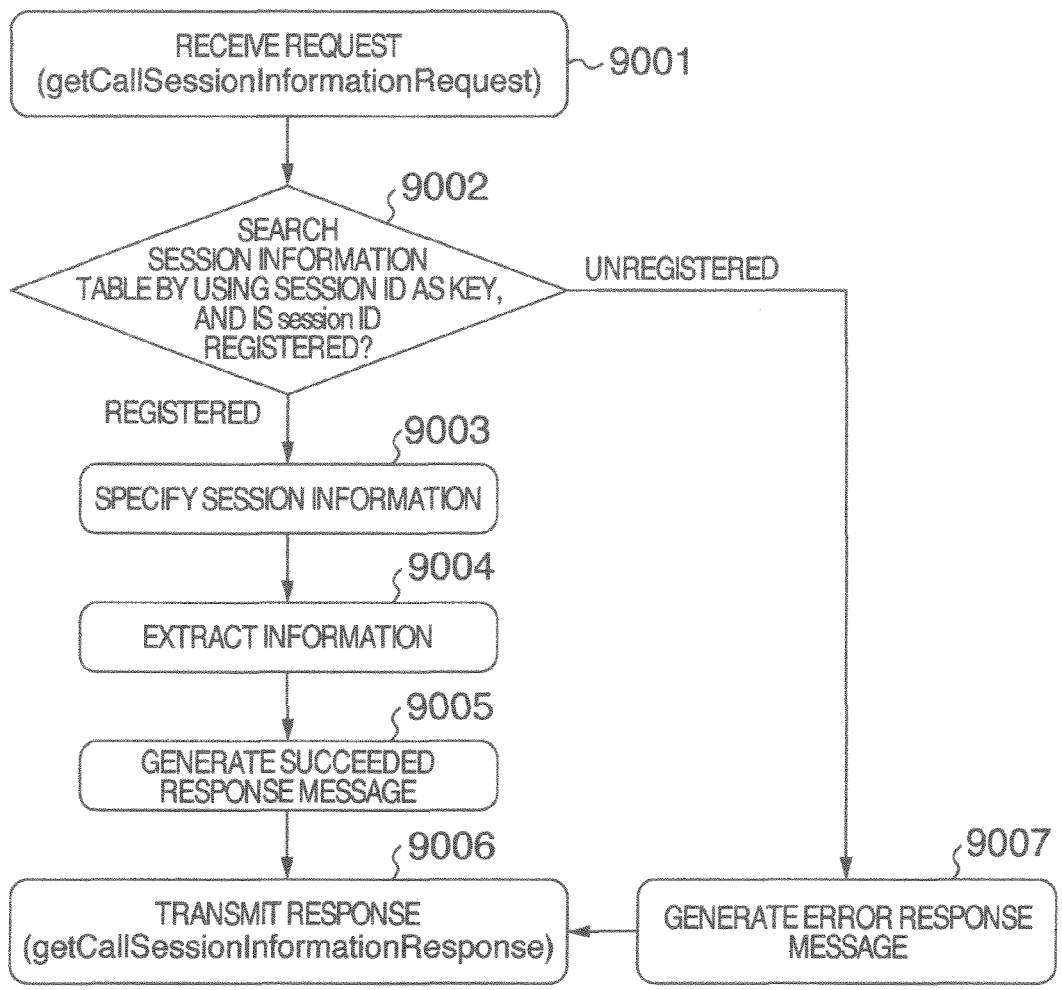
FIG. 9 is a flowchart for explaining an operation at a time of receiving a call information (session information) request in the SOAP-SIP in the embodiment.
Figure 13:
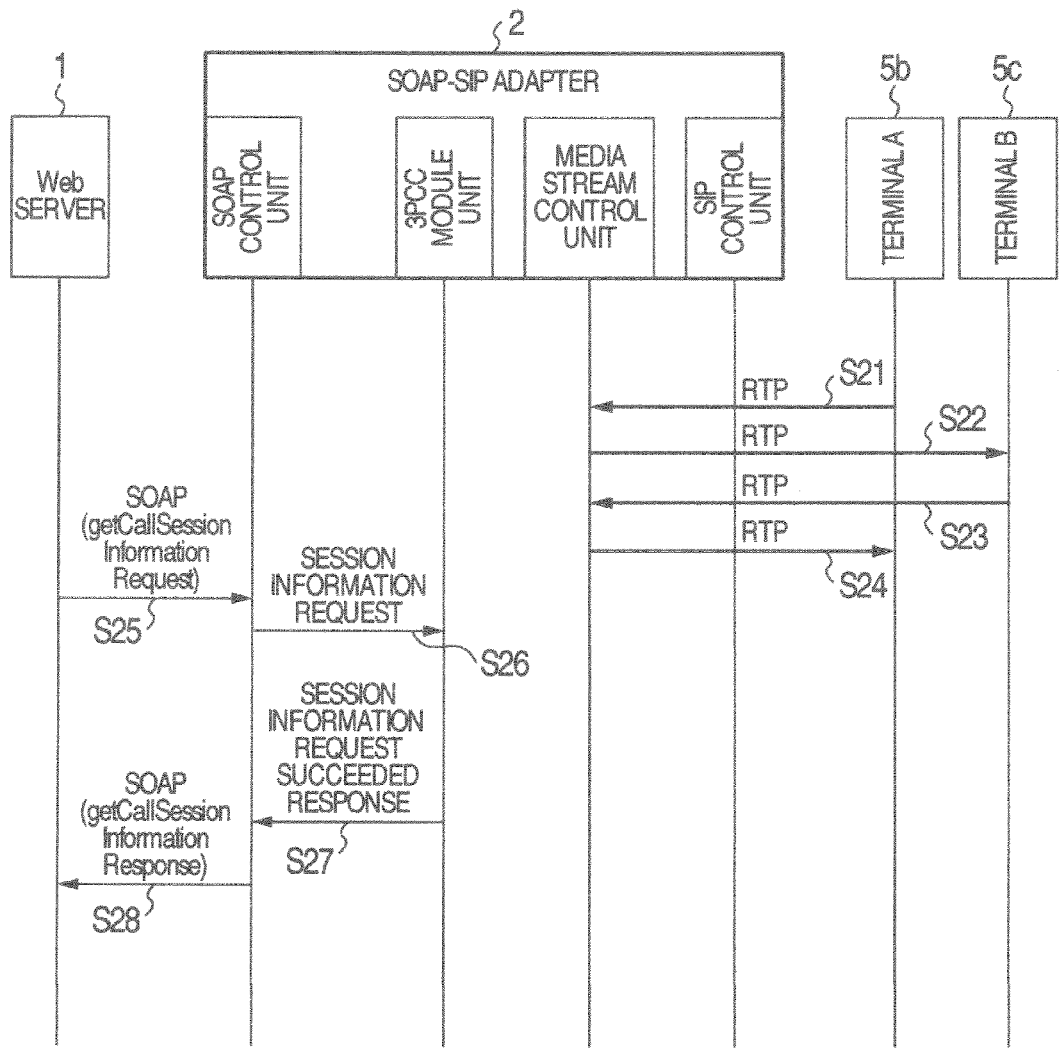
FIG. 13 is a sequence diagram for explaining a procedure at a time of receiving the call information (session information) request in the SOAP-SIP adapter in the embodiment.

FIG. 13 is a sequence diagram for explaining a procedure of receiving call information (session information) request in the SOAP-SIP adapter 2 in the embodiment. FIG. 9 is a flowchart for explaining an operation at a time of receiving the call information (session information) request in the SOAP-SIP adapter 2 in the embodiment.

Referring to FIG. 13 and FIG. 9, an operation for acquiring the call information by the Web server 1 will described below. Here, Web server 1 can acquire information corresponding to the designated session ID. The process at steps S21 to S24 in FIG. 13 corresponds to that at the above-mentioned steps S12-1 to S24-4.

The Web server 1 transmits an SOAP getCallSessionInformationRequest (session information request, call information request) to the SOAP-SIP adapter 2 at a step S25. The SOAP getCallSessionInformationRequest contains the session ID of the call information to be acquired. More specifically, the Web server 1 generates the SOAP getCallSessionInformationRequest containing the session ID stored at the above-mentioned step S4 to transmit to the SOAP-SIP adapter 2. In addition, the Web server 1 may select the session ID of the call information to be acquired from the session ID stored at the above-mentioned step S4 on the basis of the user operated terminal 5a.

The SOAP-SIP adapter 2 searches the session information table 2010 held in the SOAP-SIP adapter 2 by using the session ID contained in the SOAP getCallSessionInformationRequest as a key to then transmit an SOAP getCallSessionInformationResponse containing the table information of corresponded session ID 2011 at steps S26 to S28. A detailed operation of the steps S26 to S28 in the SOAP-SIP adapter 2 will be described below.

First, the SOAP control unit 2101 in SOAP-SIP adapter 2 receives the getCallSessionInformationRequest to transmit the session information request to the 3PCC module unit 2102 at the step S26. This session information request contains the session ID in the SOAP getCallSessionInformationRequest.

The 3PCC module unit 2102 receives the session information request at a step 9001 to search the session ID 2011 in the session information table 2010 on the basis of the session ID contained in the received session information request at a step 9002. If the session ID contained in the received session information request is already registered in the session information table 2010, the session information corresponding to the session ID 2011 is specified at a step 9003. The 3PCC module unit 2102 refers to the call participant information table (call participant condition) 2020 corresponding to the corresponded session ID 2011 to acquire respectively the 2021 and call condition 2022 corresponding to the terminals 5b, 5c, at a step 9004. Further, the 3PCC module unit 2102 acquires the recv SDP information 2036 for the respective terminals from the terminal information (for terminal A5b) 2030_A and terminal information (for terminal B5c) 2030_B corresponding to the corresponded session ID 2011.

The 3PCC module unit 2102 generates a session information request succeeded response containing the session ID 2011, received URI 2021, call condition 2022 and recv SDP information 2036 at a step 9005 to then transmit the generated session information request succeeded response to the SOAP control unit 2101 at the step S27. The SOAP control unit 2101 receives the session information request succeeded response to transmit an SOAP getCallSessionInformationResponse (session information request succeeded response) to the Web server 1 at the step S28 and a step 9006. The SOAP getCallSessionInformationResponse contains the session ID, URI, call condition and recv SDP information in the received session information request succeeded response, which is generated in accordance with the SOAP.

In addition, if the session ID contained in the received session information request is unregistered at the step 9002, the 3PCC module unit 2102 generates a session information request failed response (error response message) at a step 9007 to transmit the generated session information request failed response to the SOAP control unit 2101. The SOAP control unit 2101 receives the session information request failed response to transmit, to the Web server 1, the SOAP getCallSessionInformationResponse indicating that the session information request is failed, at the step 9006.

The Web server 1 receives the SOAP getCallSessionInformationResponse to refer to the call condition contained in the received SOAP getCallSessionInformationResponse, therefore, the condition of session, indicating whether a requested communication is realized, can be confirmed. When the call is ended from the terminal, the call condition becomes "CallParticipantsTerminated (termination condition)", and the Web server 1 can determine that the call is terminated from the terminal A5*b* or B5*c*. For example, when the call condition is not normal, the Web server 1 may stop the communication by using an after-mentioned SOAP endCallSessionRequest.

Figure 10:
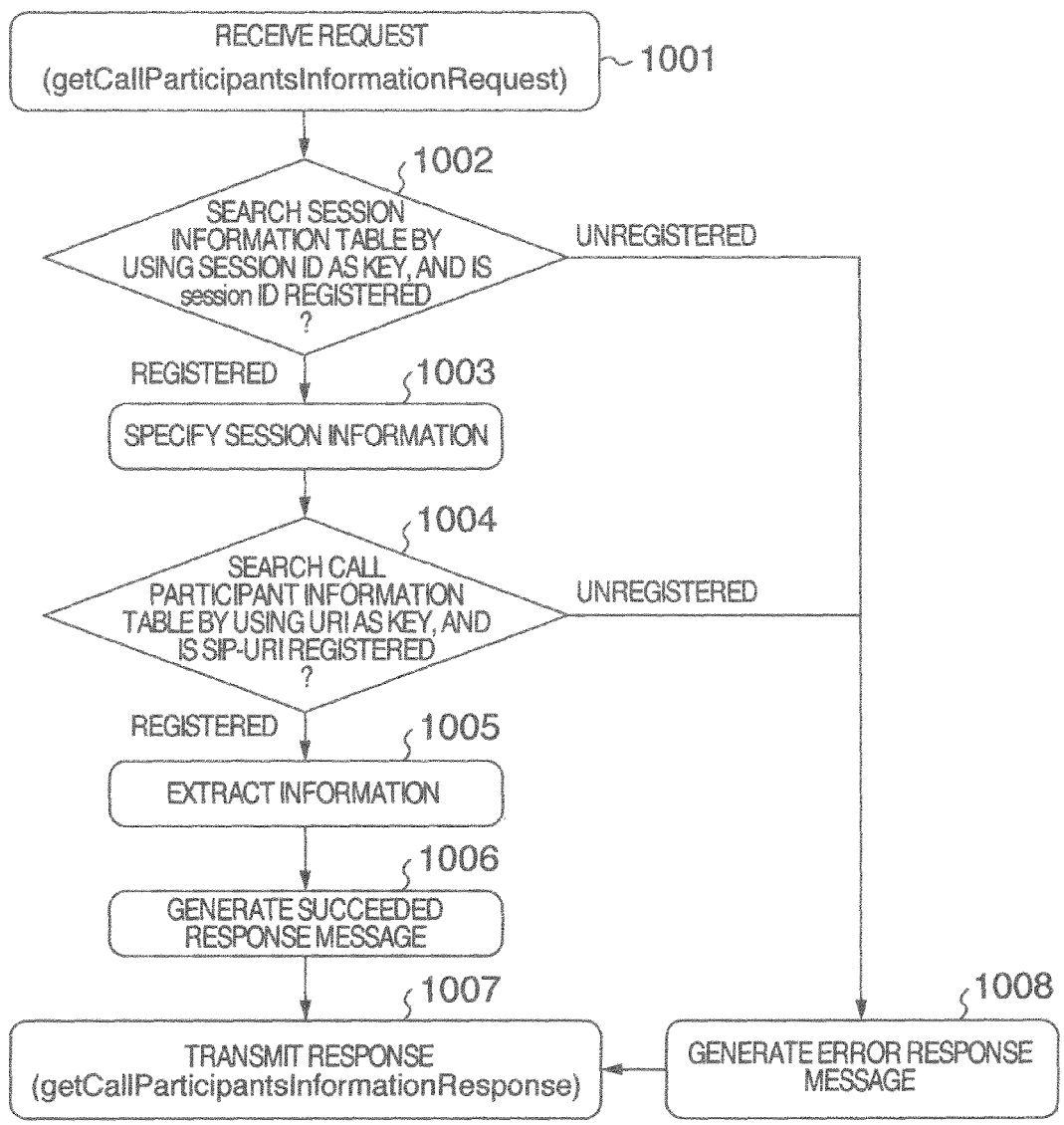
FIG. 10 is a flowchart for explaining an operation at a time of receiving a call participant information request in the SOAP-SIP adapter in the embodiment.
Figure 14:
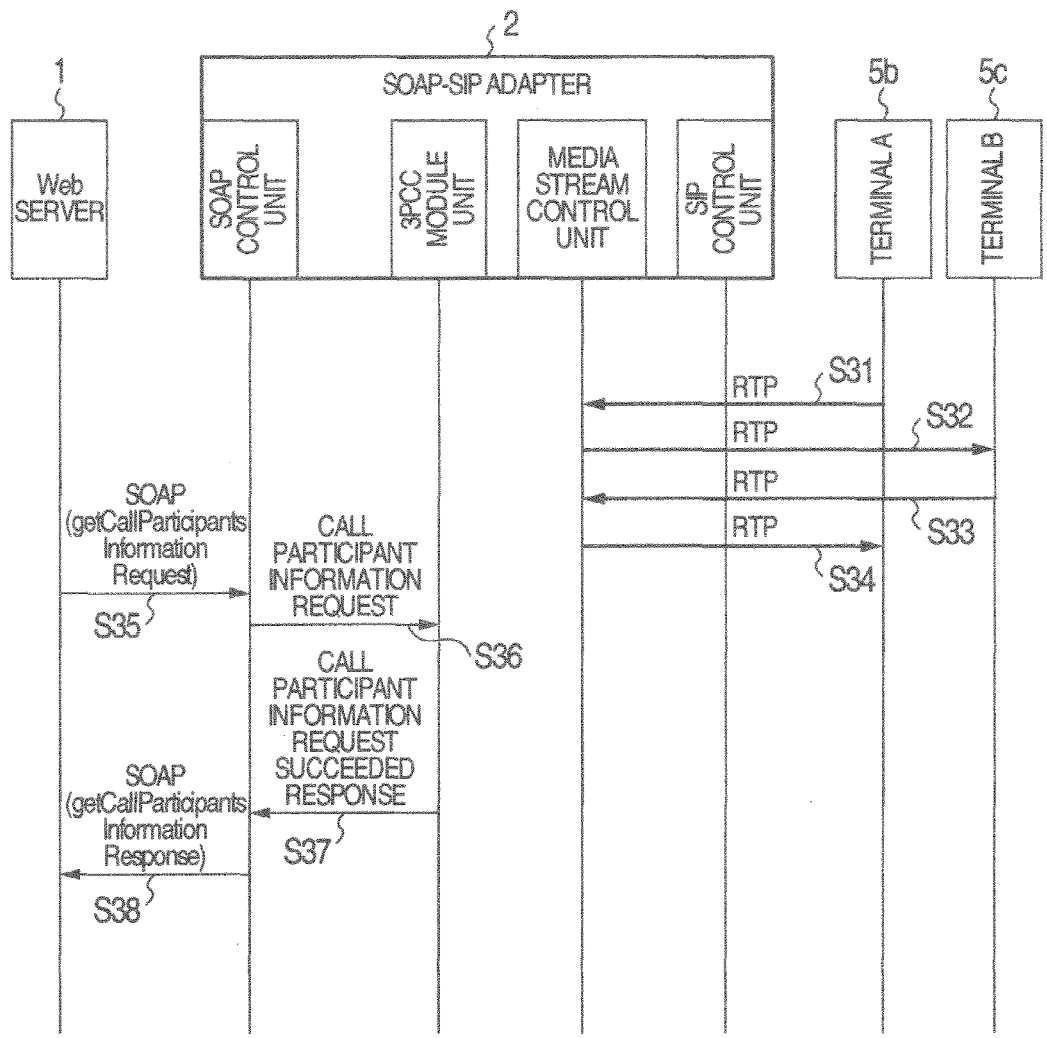
FIG. 14 is a sequence diagram for explaining a procedure at a time of receiving the call participant information request in the SOAP-SIP adapter in the embodiment.

FIG. 14 is a sequence diagram for explaining a procedure at a time of receiving the call participant information request in the SOAP-SIP adapter 2 in the embodiment. FIG. 10 is a flowchart for explaining an operation at a time of receiving the call participant information request in the SOAP-SIP adapter 2 in the embodiment.

Referring to FIG. 14 and FIG. 10, an operation for acquiring the call participant information by the Web server 1 will be described below. Here, user information corresponding to the designated SIP-URI can be acquired. The process at steps S31 to S34 in FIG. 14 corresponds to that at the above-mentioned steps S12-1 to S12-4.

The Web server 1 transmits an SOAP getCallParticipantsInformationRequest (call participant information request) to the SOAP-SIP adapter 2 at a step S35. The SOAP getCallParticipantsInformationRequest contains the session ID and URI of the call participant information to be acquired. Specifically, the Web server 1 generates the session ID stored at the above-mentioned step S4 and the SOAP getCallSessionInformationRequest containing the SIP-URI of the desired call participant to transmit to the SOAP-SIP adapter 2, for example. As one example, the Web server 1 may select the session ID of the call information to be acquired on the basis of the user operation and the user identifier (user ID, for example, user ID corresponding to the user who uses terminals A5*b* and B5*c*) from the terminal 5*a*. In addition, Web server 1 can acquire the SIP-URI corresponding to the entered user identifier (user ID) by searching the telephone book table 2410 in which the user identifier (user ID) and SIP-URI of its user are stored correspondingly with each other.

The SOAP-SIP adapter 2 searches the session information table 2010 held in the SAO-SIP adapter 2 by using the session ID contained in the SOAP getCallParticipantsInformationRequest as a key to specify the table information of the corresponded session ID 2011. The SOAP-SIP adapter 2 further searches the call participant information table 2020 by using the SIP-URI contained in the SOAP getCallParticipantsInformationRequest as a key to transmit an SOAP getCallParticipantsInformationResponse containing the table information corresponding to the corresponded SIP-URI 2021 at steps S36 to S38. An operation of the steps S36 to S38 in the SOAP-SIP adapter 2 will be described below.

The SOAP control unit 2101 in SOAP-SIP adapter 2 receives the SOAP getCallParticipantsInformationRequest to transmit the call participant information request to the 3PCC module unit 2102 at the step S36. This call participant information request contains the session ID and SIP-URI in the SOAP getCallParticipantsInformationRequest. The 3PCC module unit 2102 receives the call participant information request at the step 1001 to search the session ID 2011 in the session information table 2010 on the basis of the session ID contained in the received call participant information request at the step 1002. If the session ID contained in the received call participant information request is already registered in the session information table 2010, the session information is specified by the corresponded session ID 2011 at the step 1003. The 3PCC module unit 2102 searches the URI 2021 in the call participant information table (call participant condition) 2020 corresponding to the corresponded session ID 2011 on the basis of the SIP-URI contained in the received call participant information request at the step 1004. If the SIP-URI contained in the received call participant information request is already registered, the 3PCC module unit 2102 acquires the call condition 2022 corresponding to the corresponded URI 2021, at the step 1005. The 3PCC module unit 2102 also refers to the To URI 2038 in the terminal information table 2030 on the basis of the SIP-URI contained in the received call participant information request to acquire the corresponded recv SDP information 2036.

The 3PCC module unit 2102 generates the call participant information request succeeded response containing the acquired call condition 2022 and recv SDP information 2036 at the step 1006 to transmit the generated call participant information request succeeded response to the SOAP control unit 2101 at the step S37. The SOAP control unit 2101 receives the call participant information request succeeded response to transmit the SOAP getCallParticipantsInformationResponse (call participant information request succeeded response) to the Web server 1 at the step S38 and the step 1007. The SOAP getCallParticipantsInformationResponse contains the URI, call condition and recv SDP information in the received call participant information request succeeded response, which is generated in accordance with the SOAP.

In addition, if the session ID contained in the received call participant information request is unregistered at the step 1002 and the SIP-URI contained in the received call participant information request is unregistered at the step 1004, the 3PCC module unit 2102 generates the call participant information request failed response (error response message) at the step 1008 to transmit the generated call participant information request failed response to the SOAP control unit 2101. The SOAP control unit 2101 receives the call participant information request failed response to transmit the SOAP getCallParticipantsInformationResponse, indicating that the call participant information request is failed, to the Web server 1 at the step 1007.

Figure 11:
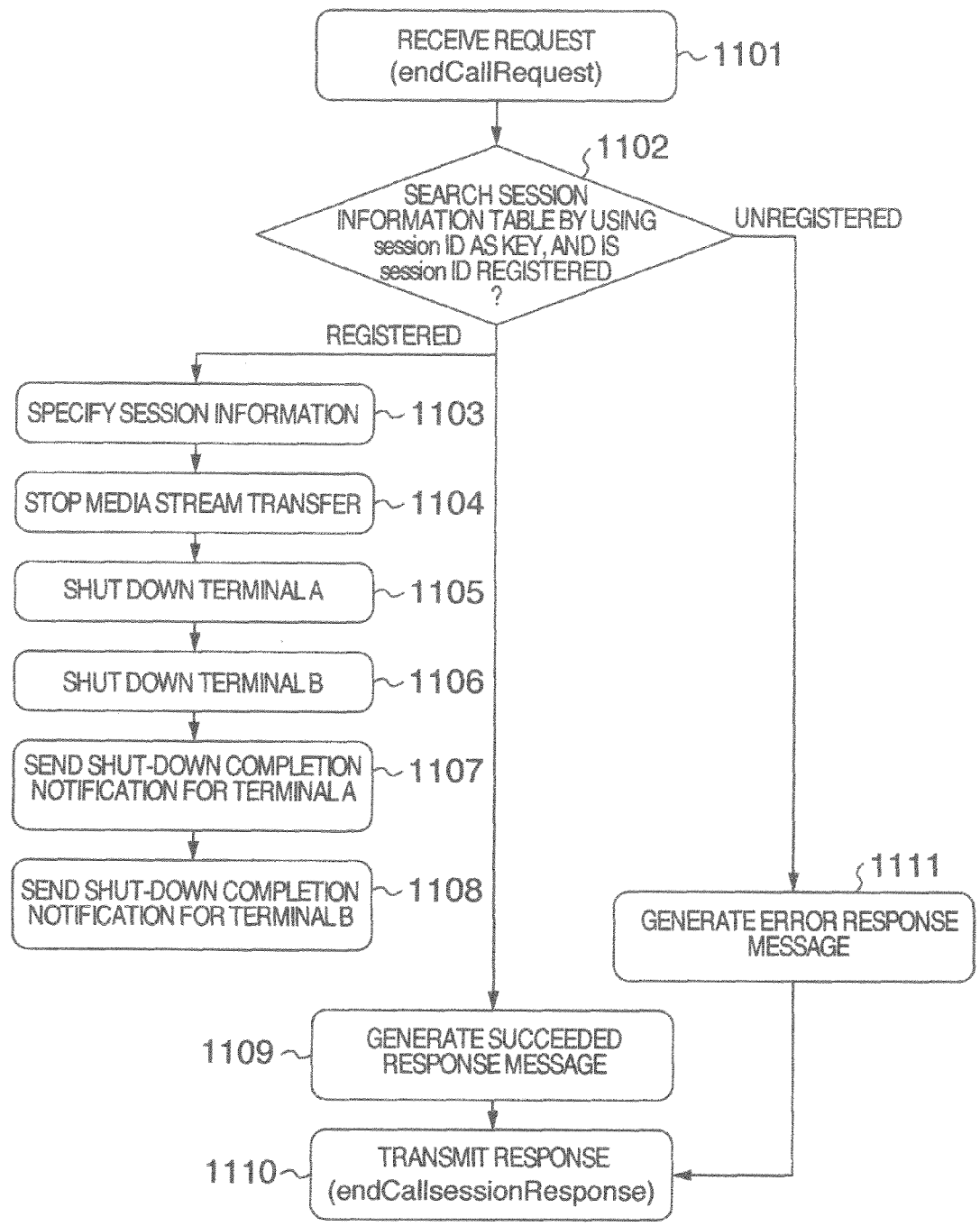
FIG. 11 is a flowchart for explaining an operation at a time of receiving a call end request in the SOAP-SIP adapter in the embodiment.
Figure 15:
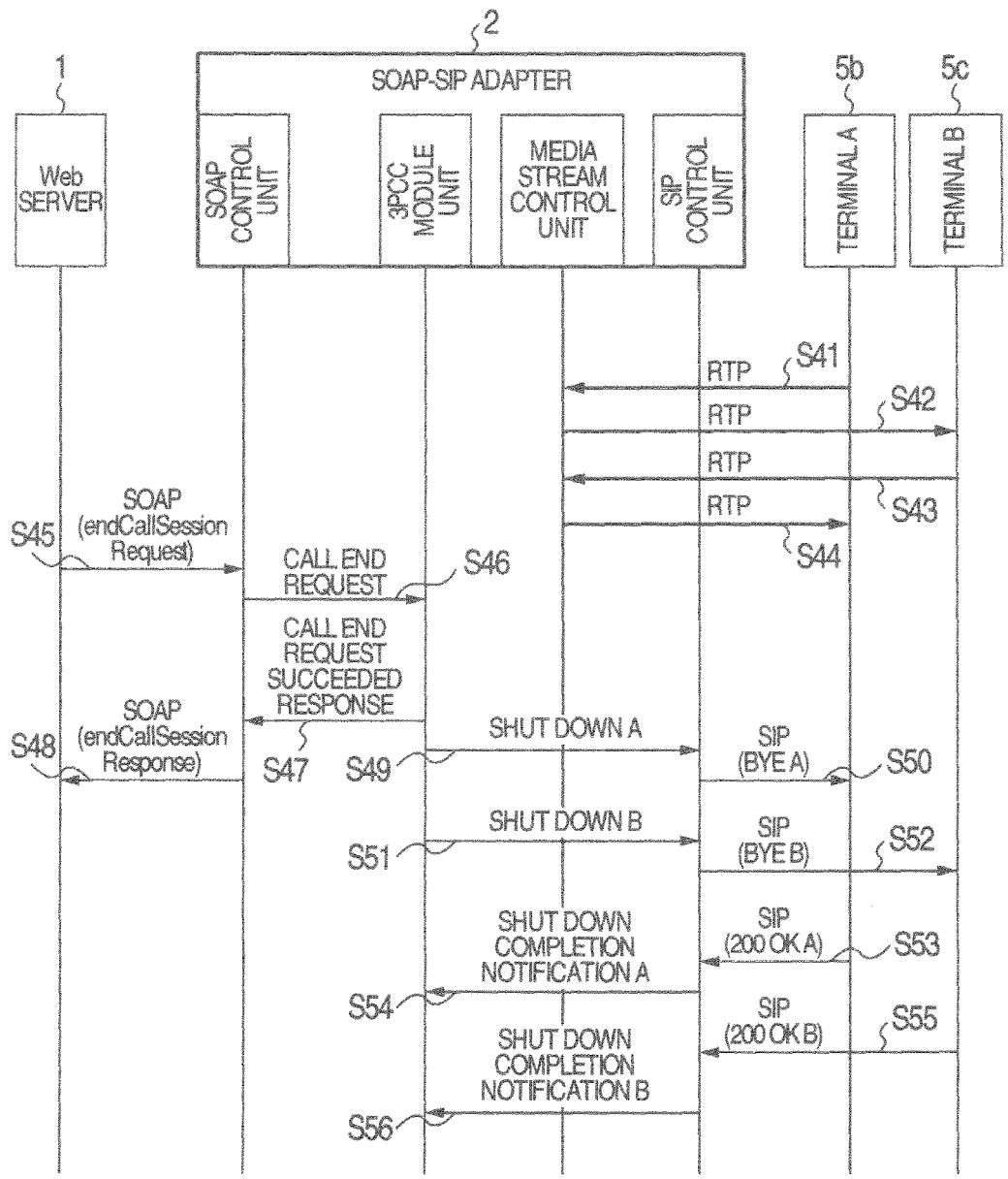
FIG. 15 is a sequence diagram for explaining a procedure at a time of receiving the call end request in the SOAP-SIP adapter in the embodiment.

FIG. 15 is a sequence diagram for explaining a procedure at a time of receiving a call end request in the SOAP-SIP adapter 2 in the embodiment. FIG. 11 is a flowchart for explaining an operation at a time of receiving the call end request in the SOAP-SIP adapter 2 in the embodiment.

An operation, when the Web server 1 ends the call, will be described with reference to FIG. 15 and FIG. 11. The process at steps S41 to S44 in FIG. 15 corresponds to that at the above-mentioned steps S12-1 to S12-4.

The Web server 1 transmits an SOAP endCallSessionRequest (call end request) to the SOAP-SIP adapter 2 at a step S45. The SOAP endCallSessionRequest contains the session ID of the call to be ended. More specifically, the Web server 1 generates the SOAP endCallSessionRequest containing the session ID stored at the above-mentioned step S4 to transmit to the SOAP-SIP adapter 2. As one example, the Web server 1 may select the session ID of the call to be ended, from the session ID stored at the above-mentioned step S4 by the terminal 5*a*.

The SOAP-SIP adapter 2 searches the session information table 2010 held in the SOAP-SIP adapter 2 by using the session ID contained in the SOAP endCallSessionRequest as a key to specify the terminals 5*b* or 5*c* to be shut down from the table information of the corresponded session ID 2011 and shut down the terminal 5*b* and/or 5*c* at steps S46 to S56. A detailed operation of the steps S46 to S56 in the SOAP-SIP adapter 2 will be described below.

The SOAP control unit 2101 in SOAP-SIP adapter 2 receives the SOAP endCallSessionRequest (call end request) to transmit the call end request to the 3PCC module unit 2102 at the step S46. This call end request contains the session ID in the SOAP endCallSessionRequest. The 3PCC module unit 2102 receives the call end request at a step 1101 to search the session ID 2011 in the session information table 2010 on the basis of the session ID contained in the received call end request at a step 1102.

If the session ID contained in the received call end request is already registered in the session information table 2010, the 3PCC module unit 2102 generates a call end request succeeded response at a step 1109 to transmit the generated call end request succeeded response to the SOAP control unit 2101 at the step S47. The SOAP control unit 2101 receives the call end request succeeded response to transmit an SOAP endCallSessionReponse (call end request succeeded response) to the Web server 1 at the step S48 and a step 1110. In addition, an only succeeded response may be transmitted to the Web server 1 other than the SOAP endCallSessionReponse.

The session information is specified by the corresponded session ID 2011 to specify the two parties (here, terminals A5b, B5c) on the telephone call at a step 1103. For example, the 3PCC module unit 2102 refers to the call participant information table 2020 corresponding to the session ID contained in the received call end request to acquire the SIP-URI 2021 of the terminals A5b, B5c. The media stream control unit 2103 stops the media stream transfer at a step 1104. In addition, a media stream transfer stop request may be transmitted from the 3PCC module unit 2102 to the media stream control unit 2103.

The 3PCC module unit 2102 transmits a shut-down request (A) containing the acquired SIP-URI to the SIP control unit 2104 in accordance with one of the acquired SIP-URIs at the step S49 and a step 1105. The SIP control unit 2104 receives the shut-down request (A) to transmit a BYE message (A) of the SIP to the terminal A5b, as set the SIP-URI contained in the received shut-down request (A) to the To URI at the step S50.

Likewise, the 3PCC module unit 2102 transmits a shut-down request (B) containing the acquired SIP-URI to the SIP control unit 2104 in accordance with the other of the acquired SIP-URIs at the step S51 and a step 1106. The SIP control unit 2104 receives the shut-down request (B) to transmit a BYE message (B) to the terminal B5c, as set the SIP-URI contained in the received shut-down request (B) to the To URI at the step S52.

The terminal A5b transmits the 200 OK (A) for the BYE message (A) received at the step S50 to the SOAP-SIP adapter 2 at the step S53. The SIP control unit 2104 in the SOAP-SIP adapter 2 receives the 200 OK (A) to transmit a shut-down completion notification (A) to the 3PCC module unit 2102 at the step S54 and a step 1107.

Likewise, the terminal B5c transmits a 200 OK (B) for the BYE message (B) received at the step S52 to the SOAP-SIP adapter 2, at the step S55. The SIP control unit 2104 in SOAP-SIP adapter 2 receives the 200 OK (B) to transmit a shut-down completion notification (B) to the 3PCC module unit 2102 at the step S56 and a step 1108.

In addition, if the session ID contained in the received call end request is unregister at the step 1102, the 3PCC module unit 2102 generates a call end request failed response (error response message) at a step 1111 to transmit the generated call end request failed response to the SOAP control unit 2101. The SOAP control unit 2101 receives the call end request failed response to transmit a SOAP endCallSession-Response indicating that the call end request is failed, to the Web server 1 at the step 1110.

Figure 19:
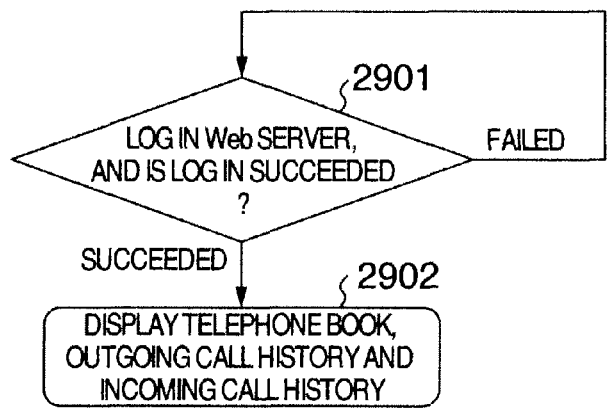
FIG. 19 is a flowchart for explaining an operation of referring pieces of data of the telephone book, outgoing call history and incoming call history in the Web server.

FIG. 19 is a flowchart for explaining an operation of referring to the telephone book data, outgoing call history data and incoming call history data by the Web server 1

The user who uses the 3PCC service accesses to and logs in the Web server 1 from the terminal 5a etc., for example. The processing unit 100 in Web server 1 searches at least one of the telephone book table, outgoing call history information table and incoming call history information table by using the user ID accepted the log-in as a key. As a result of the search, data (data group) corresponding to one user ID is extracted from each of the tables. The data (data group) extracted from the each of the tables is transmitted to the terminal 5a. Here, this embodiment has described such that the Web server 1 commands to the terminal 5a so as to transmit the data (data group) and display the data group, the data group is therefore displayed on the terminal 5a.

The logged in user having the user ID 2412 in the telephone book table 2410 can refer to the corresponded telephone book data, outgoing call history data, and incoming call history data. A display method is that a tab corresponding to pieces of data is used to be referred by a single window, for example.

FIG. 16 is a flowchart for explaining an operation of generating an outgoing call history in the Web server. If the response (makeCallSessionResponse) is received in Step 2601, it is registered into the outgoing call history information table in Step 2602.

FIG. 17 is a flowchart for explaining an operation of generating an incoming call history in the Web server. If the event notification request is received in Step 2701, the terminal information table is searched by using Correlator as key in Step 2702 while the event notification response is transmitted in Step 2703. If the Correlator in Step 2702 is registered, the user ID is acquired in Step 2704. If the Correlator in Step 2702 is not registered, no process is performed in Step 2709. After acquiring the user ID in Step 2704, the outgoing call history information table is searched by using session ID as key in Step 2705. If the Correlator in Step 2705 is registered, the received To URI is compared with the transmission destination address in Step 2706. If these are matched in Step 2706, the call source address is acquired in Step 2707 and further it is registered in the incoming call history information table is Step 2708. If the Correlator in Step 2705 is not registered or if these are not matched in Step 2706, no process is performed in Step 2709.

FIG. 18 is a flowchart for explaining an operation at a time of generating the incoming call history in the Web server. If the event notification request is received in Step 2801, the terminal information table is searched by using Correlator as key in Step 2802 while the event notification response is transmitted in Step 2803. If the Correlator in Step 2802 is registered, the user ID is acquired in Step 2804. If the Correlator in Step 2802 is not registered, no process is performed in Step 2812. After acquiring the user ID in Step 2804, the outgoing call history information table is searched by using session ID as key in Step 2805. If the Correlator in Step 2805 is registered, the received To URI is compared with the transmission destination address in Step 2806. If these are matched in Step 2806, the call source address is acquired in Step 2807. If the Correlator in Step 2805 is not registered or if these are not matched in Step 2806, no process is performed in Step 2812. After acquiring the call source address in Step 2807, the incoming call history information table is searched by using session ID as key in Step 2809. If the session ID is registered in Step 2809, the incoming call history information table is updated in Step 2810. If the session ID is not registered in Step 2809, the session ID is registered in the incoming call history information table in Step 2811.

FIG. 19 is a flowchart for explaining an operation of referring pieces of data of the telephone book, outgoing call history and incoming call history in the Web server. In Step 2901, after logging in the Web server, it is checked as whether the login is succeeded or failed. If failed, the process in Step 2901 is repeated. If succeeded, the telephone book, the outgoing call history and the incoming call history are displayed in Step 2902.

Figure 20A:
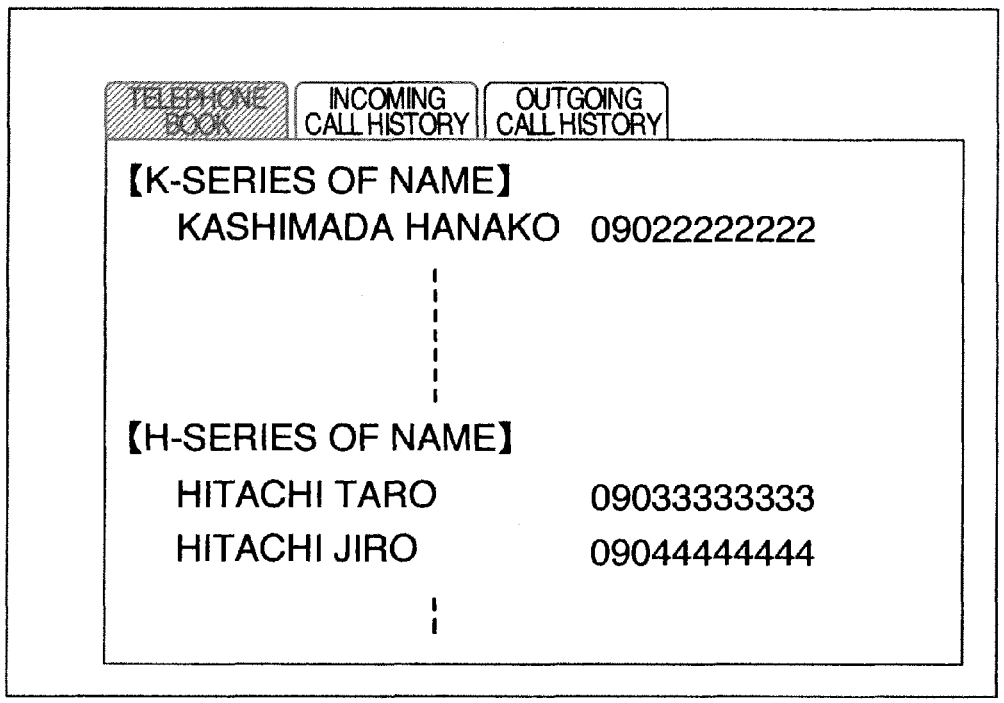
FIG. 20A is a diagram showing a display example of telephone book data.
Figure 20B:
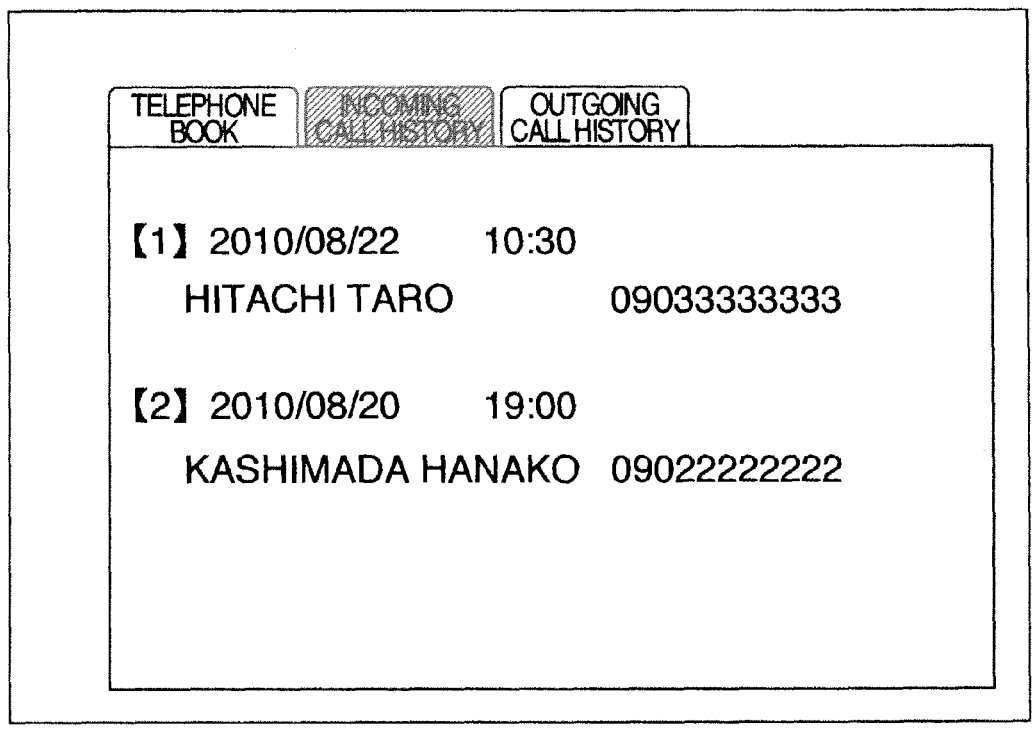
FIG. 20B is a diagram showing a display example of outgoing call history data.
Figure 20C:
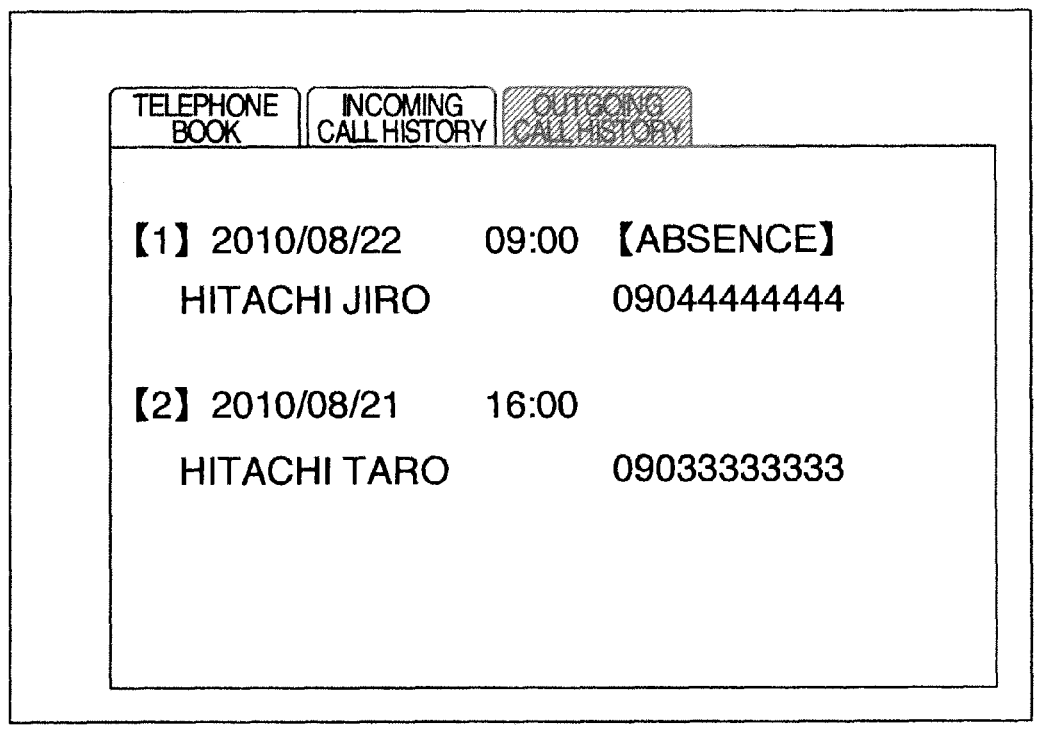
FIG. 20C is a diagram showing a display example of incoming call history data.

FIG. 20A shows a display example of the telephone book displaying information regarding the logged in user. FIG. 20B shows a display example of the outgoing call history, that is, the outgoing call history of the logged in user is displayed for every session by combining the call destination, outgoing call time and call destination display address, for example. FIG. 20C shows a display example of the incoming call history, that is, the incoming call history of the logged in user is displayed for every session by combining the call source, incoming call time and call source display address, for example.

An application may be provided such that the Web server 1 transmits the data (data group) extracted from every table to the terminal 5a, and the terminal 5a can display only the information, designated by the user, selected from the pieces of data (data group).

In addition, the registration, deletion and edition in the telephone book and the name 2413, phonetic symbol 2414 and address 2415 in the telephone book table 2410, may be updated by a GUI screen of the terminal 5a.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system comprising one or more computers configured with a server, and a communication device communicating with the server, for setting a connection between a first terminal and a second terminal by an SIP (Session Initial Protocol), wherein:

the communication device comprises:
　a first control unit configured to receive a connection request for a call between the first terminal and the second terminal from the server; and
　a second control unit configured to initiate a connection process of a session between the first terminal and the second terminal by the SIP protocol when receiving the connection request for the call, and the server comprises:
　a first memory that stores terminal information of the first terminal and the second terminal, a user ID of a user who is associated with at least either the first terminal or the second terminal;
　a second memory that stores outgoing call history information comprising outgoing call history of at least either the first terminal or the second terminal in relation to the user ID;
　a third memory that stores incoming call history information comprising incoming call history of at least either the first terminal or the second terminal in relation to the user ID; and
　a processing unit configured to:
　　register the outgoing call history information into the second memory based on a call source information of the call contained in a response to the connection request for the call when the response to the connection request for the call is received from the communication device, and
　　register the incoming call history information into the third memory based on the call source information of the call and the user IDs respectively read from the first memory and the second memory when the connection process of the session is set by the SIP protocol between the communication device and any terminal corresponding to call destination information of the call of the first terminal and the second terminal, and wherein the second terminal is a call destination and is configured to send a calling notification to the communication device the calling notification indicating that the second terminal is being called, wherein the server is configured to receive a connection notification based on the calling notification from the communication device, register an address of the first terminal, which is a call source in the incoming call history associated with the user ID and is in relation to the second terminal based on the connection notification, make an incoming call flag as an absence incoming call condition, the incoming call flag being included in the incoming call history belonging to the user ID and is in relation to the second terminal based on the connection notification, wherein the second terminal which is the call destination is configured to send a connection ok notification to the communication device, and wherein the server is configured to receive the connection ok notification, and to make the incoming call flag as a normal incoming call condition based on the connection ok notification.

2. The system according to claim 1, wherein the second control unit is configured to receive a calling notification from the first terminal when setting the connection of the session with the first terminal, the first control unit is configured to transmit a connection notification to the server when the second control unit receives the calling notification, and the processing unit is configured to read out the information from the first memory in accordance with information contained in the connection notification to register the incoming call history information in the third memory when the server receives the connection notification.

3. The system according to claim 1, wherein the second control unit is configured to receive a calling notification from the first terminal when setting the connection of the session with the first terminal, the first control unit is configured to transmit a connection notification to the server when the second control unit receives a calling notification, and the processing unit is configured to collate with the outgoing call history information contained in the second memory to read out corresponding information in accordance with information contained in the connection notification, read out the information from the first memory, and register the incoming call history information in the third memory when the server receives the connection notification.

4. The system according to claim 2, wherein the second control unit is configured to receive a 200 OK from the second terminal when setting the connection of the session with the second terminal, the first control unit is configured to transmit a response notification to the server when the second control unit receives the 200 OK, the processing unit is configured to collate with the incoming call history information contained in the third memory to read out corresponding information in accordance with the information contained in the response notification, read out the information from the first memory, and update the incoming call history information in the third memory when the server receives the response notification.

5. The system according to claim 1, wherein the first memory stores correspondingly a terminal ID of the first terminal and the second terminal, and a telephone number of the first terminal and the second terminal.

6. The system according to claim 1, wherein the second memory stores correspondingly the user ID, a session ID relative to the session, call destination information, call source information, and outgoing call time information.

7. The system according to claim 1, wherein the third memory stores correspondingly the user ID a session ID relative to the session, call source information, and incoming call time information.

8. The system according to claim 1, further comprising:
a fourth memory that stores correspondingly the user ID and the second terminal, and a connection destination designated address and a display address of the first terminal and the second terminal; and
the processing unit is configured to store information read out the fourth memory in the second memory and the third memory.

9. The system according to claim 8, wherein the processing unit is configured to search at least one of either the second memory, the third memory or the fourth memory by using the user ID accepted at log in from the third terminal to extract a searched result from each of the memories and transmit to the third terminal.

10. A server that controls setting a connection between a first terminal and a second terminal via a communication device for setting the connection of a session between the first terminal and the second terminal by an SIP protocol and that sends a connection request of a call between the first terminal and the second terminal, said server comprising:
a first memory that stores terminal information of the first terminal and the second terminal, a user ID of a user who is associated with at least either the first terminal or the second terminal;
a second memory that stores outgoing call history information comprising outgoing call history of at least either the first terminal or the second terminal in relation to the user ID;
a third memory that stores incoming call history information comprising incoming call history of at least either the first terminal or the second terminal in relation to the user ID; and
a processing unit comprising one or more computers configured to:
register the outgoing call history information into the second memory based on a call source information of the call contained in a response to the connection request for the call when the response to the connection request for the call is received from the communication device, and
register the incoming call history information into the third memory based on the call source information of the call and the user IDs respectively read from the first memory and the second memory when the connection process of the session is set by the SIP protocol between the communication device and any terminal corresponding to call destination information of the call of the first terminal and the second terminal, and wherein the second terminal is a call destination and is configured to send a calling notification to the communication device, the calling notification indicating that the second terminal is being called, wherein the server is configured to receive a connection notification based on the calling notification from the communication device, register an address of the first terminal, which is a call source in the incoming call history associated with the user ID and is in relation to the second terminal based on the connection notification, make an incoming call flag as an absence incoming call condition, the incoming call flag being included in the incoming call history belonging to the user ID and is in relation to the second terminal based on the connection notification, wherein the second terminal which is the call destination is configured to send a connection ok notification to the communication device, and wherein the server is configured to receive the connection ok notification, and to make the incoming call flag as a normal incoming call condition based on the connection ok notification.

11. The server according to claim 10, wherein the processing unit is configured to read out the information from the first memory in accordance with information contained in a connection notification from the communication device to register the incoming call history information in the third memory when the communication device receives a calling notification from the first terminal.

12. The server according to claim 10, wherein the processing unit is configured to collate with the outgoing call history information contained in the second memory to read out corresponding information in accordance with the information contained in the connection notification received from the communication device, read out the information from the first memory, and register the incoming call history information in the third memory when the communication device receives a calling notification from the first terminal.

13. The server according to claim 10, wherein the processing unit is configured to collate with the incoming call history information contained in the third memory to read out corresponding information in accordance with the information contained in a response notification received from the communication device, read out the information from the first memory, and update the incoming call history information in the third memory when the communication device receives a 200 OK from the second terminal.

14. The server according to claim 10, further comprising
a fourth memory that stores correspondingly the user ID, and a connection destination designated address and a display address of the first terminal and the second terminal; and
the processing unit is configured to store information read out from the fourth memory in the second memory and the third memory.

15. The server according to claim 14, wherein the processing unit is configured to search at least one of either the second memory, the third memory or the fourth memory by using the user ID accepted at log in from the third terminal as a key to extract a searched result from each of the memories and transmit to the third terminal.

\* \* \* \* \*